US012568998B2

(12) United States Patent
Somers et al.

(10) Patent No.: US 12,568,998 B2
(45) Date of Patent: Mar. 10, 2026

(54) FLAVOURING COMPOSITION WITH BALANCED TASTE PROFILE

(71) Applicant: SYMRISE AG, Holzminden (DE)

(72) Inventors: Tom Somers, Holzminden (DE); Thomas Riess, Holzminden (DE); Katharina Reichelt, Holzminden (DE); Egon Gross, Holzminden (DE); Dariah Lutsch, Dransfeld (DE); Michael Backes, Holzminden (DE); Rebecca Wiebusch, Holzminden (DE); Susanne Paetz, Höxter (DE)

(73) Assignee: SYMRISE AG, Holzminden (DE)

(*) Notice: Subject to any disclaimer, the term of this patent is extended or adjusted under 35 U.S.C. 154(b) by 167 days.

(21) Appl. No.: 18/005,442

(22) PCT Filed: Jun. 9, 2022

(86) PCT No.: PCT/EP2022/065648
§ 371 (c)(1),
(2) Date: Jan. 13, 2023

(87) PCT Pub. No.: WO2022/258736
PCT Pub. Date: Dec. 15, 2022

(65) Prior Publication Data

US 2024/0148039 A1 May 9, 2024

(30) Foreign Application Priority Data

Jun. 9, 2021 (WO) ................ PCT/EP2021/065380

(51) Int. Cl.
*A23L 27/00* (2016.01)
*A23L 27/30* (2016.01)

(52) U.S. Cl.
CPC ............... *A23L 27/88* (2016.08); *A23L 27/33* (2016.08); *A23L 27/36* (2016.08); *A23L 27/37* (2016.08)

(58) Field of Classification Search
CPC ................................ A23L 27/88; A23L 27/33
See application file for complete search history.

(56) References Cited

U.S. PATENT DOCUMENTS

| | | | | |
|---|---|---|---|---|
| 8,679,461 | B2 * | 3/2014 | Ley | A23L 27/00 426/536 |
| 2008/0242740 | A1 | 10/2008 | Ley et al. | |
| 2019/0373921 | A1 * | 12/2019 | Delattre | A23L 27/30 |

FOREIGN PATENT DOCUMENTS

| | | | |
|---|---|---|---|
| CN | 111018684 | A | 4/2020 |
| EP | 3704954 | A1 | 9/2020 |
| JP | 2019514346 | A | 6/2019 |

(Continued)

OTHER PUBLICATIONS

Chinese Office Action issued on Sep. 2, 2023 for corresponding Chinese Application No. 202280005578.9.

(Continued)

*Primary Examiner* — Jenna A Watts
(74) *Attorney, Agent, or Firm* — POLSINELLI PC

(57) ABSTRACT

The present invention concerns a flavouring composition comprising hesperetin and hesperetin dihydrochalcone for improving the taste profile in a preparation. Furthermore, the present invention relates to preparations having a balanced taste profile as well as a method for improving the taste profile of a preparation.

20 Claims, 7 Drawing Sheets

(56) References Cited

FOREIGN PATENT DOCUMENTS

| | | | |
|---|---|---|---|
| WO | 2017186299 | A1 | 11/2017 |
| WO | 2018001703 | A1 | 1/2018 |

OTHER PUBLICATIONS

International Search Report and Written Opinion issued on Oct. 27, 2022, for corresponding PCT application No. PCT/EP2022/065648.
International Search Report and Written Opinion issued on Mar. 2, 2022 for corresponding priority application PCT/EP2021/065380.
Japanese Office Action and English translation mailed on Apr. 8, 2024 for corresponding Japanese Application No. 2023-507793.

* cited by examiner

FLAVOURING COMPOSITION WITH BALANCED TASTE PROFILE

CROSS-REFERENCE TO RELATED APPLICATIONS

This application is a national stage application (under 35 U.S.C. § 371) of PCT/EP2022/065648, filed Jun. 9, 2022, which claims benefit of PCT Application No. PCT/EP2021/065380, filed Jun. 9, 2021, which are incorporated herein by reference in their entireties.

The present invention concerns a flavouring composition comprising hesperetin and hesperetin dihydrochalcone for improving the taste profile in a preparation. Furthermore, the present invention relates to preparations having a balanced taste profile as well as a method for improving the taste profile of a preparation.

Food or beverages having a high sugar content (primarily sucrose, lactose, glucose or fructose or mixtures thereof) and therefore a sweet taste are usually strongly preferred by consumers. It is generally known that the consumption of a high content of easily metabolisable carbohydrates such as the above-described sugars allows the blood sugar level to increase and could potentially—if consumed in excess—lead to the formation of fatty deposits. This can cause, if not controlled or counteracted, excess weight, obesity, insulin resistance, late-onset diabetes and associated secondary diseases. In particular, many of the above-mentioned carbohydrates can also affect dental health as they are broken down by specific types of bacteria in the oral cavity into lactic acid and can attack the tooth enamel of adolescent or adult teeth leading to the formation of holes or inflammatory.

The aim of the food industry is therefore to decrease the amount of sugar in foods and beverages to a minimal amount, preferably such as that the consumer does not note a difference in taste. One possibility to retain the sweet taste is the use of sweeteners. These are substances, which do not themselves have a calorific value, or have only a very low calorific value, and simultaneously give a strong sweet taste impression. The substances are usually non-cariogenic (overview: Valerie B. Duffy, Madeleine Sigman-Grant, Margaret A. Powers, Denise Elmore, Esther F. Myers, Diane Quagliani, Marie Spano, Kimberly F. Stitzel, Sue Taylor, Robert Earl and Sonja Connor, *Journal of the American Dietetic Association* 2004, 104 (2), 255-275). Some of them are known as bulk sweeteners, such as sorbitol, mannitol or other sugar alcohols, and can also partially replace the properties of sugars, but too frequent intake leads to osmotically-induced digestion problems among some people. Because of their low concentration in use, the non-nutritive, highly intensive sweeteners are very suitable for bringing sweetness into foods. Nonetheless, they often exhibit taste-related off-notes which are not similar to sugar (e.g. sucralose, stevioside, cyclamate), a bitter and/or astringent aftertaste (e.g. acesulfame K, saccharin), or additional undesired flavour impressions (e.g. glycyrrhetinic acid ammonium salt).

Various substances can be present in food and beverages, which have an unpleasant taste, e.g. bitter substances, strongly sour substances and astringent substances, which on the one hand in moderation are desirable and characteristic (e.g. caffeine in tea or coffee, tannins in red wine or green tea, quinine in so-called bitter-lemon beverages, saponins or isoflavonoids or glycosides thereof in soya milk, hop extracts in beer, fruit acids or edible acids in sweet fruit juices), but on the other hand can also greatly reduce the value. Often, the unpleasant taste is further intensified by unpleasant odor, for example in soya milk, which often has a bitter and astringent taste, a note generally designated as "beany" is also described as unpleasant.

Bitter taste is regularly caused by particular substances, which bind to special bitter receptors on taste cells (which are to be found in the so-called taste buds on the tongue) and, via neurochemical cascades, send a signal to the brain, which causes a defence reaction and a negative taste impression (cf. Wolfgang Meyerhof, Reviews of Physiology, Biochemistry and Pharmacology 2005, 154, 37-72).

Astringent taste is caused by precipitation of proline-rich proteins in the saliva by astringents, e.g. metal salts or tannins. The normally homogeneous saliva that serves as a "lubricant" then contains denatured proteins, which reduce the lubricity and so leave a rough or dry sensation in the mouth, which is also experienced as astringent (Isabelle Lesschaeve, Ann C. Noble, American Journal of Clinical Nutrition 2005, 81, 330S-335S).

Sour taste is caused by protic acids. The so-called titratable proton concentration is then more decisive than the pH for the sour impression: for example, a hydrochloric acid solution with the same pH as a malic acid solution tastes far less sour in comparison. In general, the aversive sour taste is toned down considerably by combining with sweet flavouring materials, principally sugar, or even by substances that taste salty, mainly sodium chloride, whereas the sour taste is perceived as much more unpleasant with bitter or astringent tasting substances. However, sweet-tasting substances (for example sweeteners) are regularly used at high concentrations, which correspond to an amount which, with respect to their sweet taste impression, would correspond to an at least 2 wt.-% aqueous sucrose solution, to achieve a marked toning-down of the sour impression.

Some foods or beverages, which are derived from sweet-sour fruits or vegetables (e.g. fruit juices, fruit preparations and foodstuffs produced from them) and products produced by fermentation by acid-producing microorganisms (e.g. yogurt, ghee, kefir, soya-yogurt, sauerkraut, sourdough bread, sausages, sour milk, cheese, mixed pickles, refreshing drinks containing lactobionic acid or glucuronic acid) contain a high amount of sour tasting substances, which are needed for microbial stability. Up to a certain degree this is accepted as taste-related, but in many cases there is a desire to achieve a reduced sour sensory impression without affecting the pH, which is required for maintaining the product quality.

Non-nutrient, highly intensive sweeteners also often exhibit taste problems. The steviol glycosides (for example stevioside, rebaudioside A-Z [A, B, C, D, E, F, G, H, I, O, M, N, V, W, X, Z, KA, etc.], steviolbioside, dulcoside A, dulcoside B, rubusoside, suavioside A, B and G-J) naturally occurring in *Stevia* ssp. or *Rubus* ssp., while being very good sweeteners, at the concentrations necessary for an adequate sweetening effect (for example 400-600 ppm for rebaudioside A [purity>90%] in soft drinks, in order to achieve a sweetness corresponding to a concentration of sucrose of 10% by weight) already exhibit a pronounced licorice-like and unpleasant bitter and astringent off-taste and/or aftertaste.

It is therefore a particular goal of the food industry to find suitable alternatives to sweeteners exhibiting taste problems, which have a high sweet taste without exhibiting certain off-tastes.

WO 2007/014879 A1 describes the use of hesperetin as an intensifier of the sweet flavor of sugar-reduced preparations. However, hesperetin shows a diminished effectivity in preparations having a high content of acid such as lemonades or fruit juices. However, these preparations are one of the main targets for sweetness improvement with low calorie sweeteners.

Other potentially sweetness modulating compounds are dihydrochalcones. When looking at the structural level of these compounds, the relationship between structure and sweetening power of a compound were investigated as far back as 1979 (J. Chem. Senses 1979, 4(1), 35-47). It was found that the 3-hydroxy-4-methoxy-phenyl group represents an important condition for a powerful sweetener, and reversing the substituents is associated with a loss of sweetening power. The intensively sweet tasting dihydrochalcone (1) and the surprisingly tasteless dihydrochalcone (2) are presented in said publication. Hesperetin dihydrochalcone itself, as well as potential masking or sweetness intensifying features of these compounds are not described.

(1)

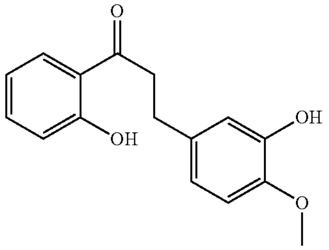

(2)

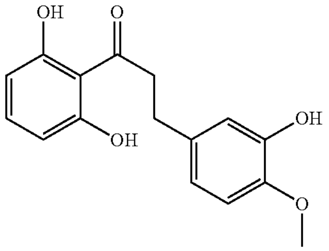

Hesperetin dihydrochalcone is mentioned in the publication J. Med. Chem. 1981, 24(4), 408-428, which similarly deals with sweeteners based on a dihydrochalcone structure. The importance of the 3-hydroxy-4-methoxy-phenyl group for a clear sweetness impression is also emphasized here, and furthermore the 2,6-dihydroxy-substitution pattern of the remaining aromatic compounds is assumed to be particularly important for a strong sweetness impression. No further sensory effects of hesperetin dihydrochalcone are described.

In patent application WO2007/107596 A1, 4-hydroxydihydrochalcones of Formula (3) and their salts are described for the intensification of sweet sensorial impressions.

(3)

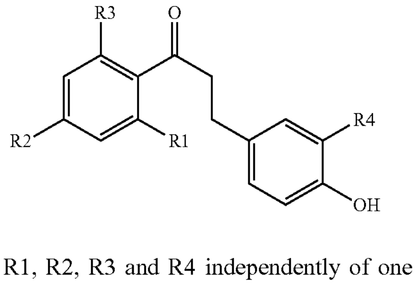

wherein R1, R2, R3 and R4 independently of one another denote H, OH or O-alkyl (with preferably 1-4 C-atoms, i.e.

preferably C1 to C4 alkoxy), respectively, on condition that at least one of the residues R1, R2 or R3 signifies OH. However, for the sweetness-intensifying effects found for hesperetin dihydrochalcone a 4-hydroxy-substitution was necessary. Hesperetin dihydrochalcone itself does not exhibit a strong sweet taste by its own at low dosing regimens.

WO2017/186299 A1 discloses the use of hesperetin dihydrochalcone for suppressing a variety of different taste perceptions. Some application examples therein also disclose mixtures with various sweet-tasting substances, one of them being hesperetin. In these cases, hesperetin is always present in an amount much higher than hesperetin dihydrochalcone. In the general context of the application examples disclosed therein, it is immanent that sweet-tasting substances in general are present in an excess compared to hesperetin dihydrochalcone. Mixtures of hesperetin dihydrochalcone with corn syrup with increased fruit sugar content and other sweeteners are described in WO 2019/080990 A1. This application describes the use of an excess of sweeteners in comparison to hesperetin dihydrochalcone.

It is thus desired in the food industry to have flavouring compositions available, which can both balance the taste profile of a preparation in terms of the sweetness profile and also have a decreased amount of sweeteners.

The primary object of the present invention was thus to provide flavouring compositions exhibiting highly efficient taste-modulating properties, especially in terms of the sweetness profile.

This primary object was solved by providing a flavouring composition comprising a) hesperetin and b) hesperetin dihydrochalcone, wherein hesperetin and hesperetin dihydrochalcone are present in a weight ratio of from 1:1 to 1:2000, preferably of from 1:1.5 to 1:100, more preferably of from 1:2.5 to 1:10, especially preferably of from 1:1 to 1:10 and c) optionally at least one additional flavouring.

A flavouring composition as used herein describes a mixture comprising or consisting of substances that are able to cause, increase or modulate a/the taste when consuming the composition or when added to a preparation for consumption.

Surprisingly it was found that hesperetin was able to synergistically enhance the sweetness-modulating properties of hesperetin dihydrochalcone when used in an amount smaller or equal to hesperetin dihydrochalcone. Even though hesperetin dihydrochalcone itself does not exhibit a particular sweet taste, it was observed that sweet-tasting preparations comprising such flavouring compositions having an excess of hesperetin dihydrochalcone in comparison to hesperetin taste sweeter, have a better mouthfeel and sweet taste profile in comparison to preparations comprising either hesperetin or hesperetin dihydrochalcone.

One preferred embodiment relates to a flavouring composition consisting of a) hesperetin and b) hesperetin dihydrochalcone, wherein hesperetin and hesperetin dihydrochalcone are present in a weight ratio of from 1:1 to 1:2000, preferably of from 1:1.5 to 1:100, more preferably of from 1:2.5 to 1:10, and c) optionally at least one additional flavouring.

Another preferred embodiment relates to a flavouring composition consisting of a) hesperetin and b) hesperetin dihydrochalcone, wherein hesperetin and hesperetin dihydrochalcone are present in a weight ratio of from 1:1 to 1:10, especially preferably of from 1:1 to 1:6, and c) optionally at least one additional flavouring.

One preferred embodiment of the present invention relates to a flavouring composition according the present invention, wherein hesperetin is contained in an amount of from 0.01 wt.-% to 20 wt.-% and hesperetin dihydrochalcone is contained in an amount of from 0.01 wt.-% to 20 wt.-% based on the total weight of the composition.

Particularly preferred is a composition comprising or consisting of a) hesperetin and b) hesperetin dihydrochalcone, wherein hesperetin and hesperetin dihydrochalcone are present in a weight ratio of 1:6 or especially preferably of 1:3.33 or especially preferably of 1:2.5.

Another preferred embodiment of the flavouring composition according to the present invention relates to a flavouring composition, wherein the composition additionally comprises at least one additional flavouring c) selected from the group consisting of

- aliphatic flavouring substances, especially saturated aliphatic alcohols, such as ethanol, isopronanol, butanol, isoamyl alcohol, hexanol, 2-heptanol, octanol (1/2/3), decanol, unsaturated aliphatic alcohols, such as cis-2 pentenol, cis-3 hexenol, trans-2 hexenol, trans-3 hexenol, cis-2 octenol, 1-octen-3-ol, cis-6 nonen-1-ol, trans-2, cis-6 nonadienol, aliphatic aldehydes such as saturated aliphatic aldehydes (e.g. acetaldehyde, propionaldehyde, butyraldehyde, isobutyraldehyde, valeraldehyde, isolvaleraldehyde, hexanal, 3-methyl hexanal, octanal, nonanal, or mono- or multi-unsaturated aliphatic aldehydes, such as 2-methyl but-2-enal, trans-2 hexenal, cis-3 hexenal, cis-4 hexenal, trans-2 octenal, trans-2 nonenal, cis-6 nonenal, trans-2, cis-6 nonadienal, trans 2 decenal, trans-2, trans-decadienal, aliphatic ketones, e.g. saturated ketones (such as 2-butanone, 2-pentanone, 2-heptanone, 2-octanone, 2-methylheptan-3-one, 2-decanone, 2-undecanone), unsaturated ketones (such as 1-penten-3-one, 1-hexen-3-one, 5-methyl-3-hexenone, 3-hepten-2-one, 1-octen-3-one, 2-octen-4-one, 3-octen-2-one, 3-none-2-one), aliphatic diketones and aliphatic diketoles, e.g. diacetyl, acetyl methyl carbinol, 2,3-hexanedione, aliphatic acids, such as straight-chain saturated acids, such as acetic acid, propionic acid, butyric acid, isobutyric acid, valeric acid, heptanoic acid, octanoic acid, decanoic acid, branched-chain saturated acids, such as 2-methyl heptanoic acid, 4-ethyl octanoic acid, and unsaturated acids, such as 2-butenoic acid, 2-pentenoic acid, 4-pentenoic acid, 2-methyl pentenoic acid, trans-3 hexenoic acid, cis-3 hexenoic acid, 3-octenoic acid, linoleic acid), aliphatic esters, such as saturated esters, e.g. methyl acetate, methylbutyrate, methyl-2-methylbutyrate, methyl hexanoate, ethylacetate, ethylbutyrate, ethyl-2-methylbutyrate, ethyl-3-methylbutyrate, ethyl hexanoate, ethyl decanoate, isopropyl acetate, isobutyl acetate, isobutyl valerate, isoamyl acetate, isoamyl butyrate, isoamyl isovalerate, hexyl acetate, hexyl hexanoate, 3-octyl acetate and unsaturated esters, such as methyl 2-hexenoate, allyl hexanoate, cis-3 hexenyl acetate, cis-3 hexenyl butyrate, aliphatic thiols and dithiols (e.g. propane thiol, allyl mercaptan, 1-methoxy-3-methylbutane-3-thiol, dimethyl sulfide, dimethyl trisulfide, dipropyl sulfide, diallyl trisulfide, other aliphatic sulfur compounds, such as 2-mercapto-3-butanol, methyl thio propanal, 3-mercapto-pentanone, 4-methoxy-2-methyl-2-mercaptobutanone, methyl thiobutyrate, methyl thiobutyrate, methyl 3-methylthiopropionate, aliphatic nitrogen compounds, such as butyl amine, trimethyl amine, allyl isothiocyanate, isopropyl isothiocyanate, alicyclic compounds, such as alicyclic ketones, e.g. cis-jasmone, isophorone, 4-ketoisophorone, alicyclic esters such as methyl jasmonate, hedione, terpenes, e.g. terpene alcohols, such as linalool, citronellol, geraniol, nerol, alpha terpineol, menthol, 8-p-menthene-1,2-diol, fenchol, borneol, nerolidol, hotrienol, terpene aldehydes such as geranial, neral, citronellal, beta-sinensal, terpene ketones, such as alpha-ionone, (D)-carvone, (L)-carvone, nootkatone, piperitone, menthone, alpha damascone, beta damascene, damascenone, terpene esters, such as linalyl acetate, geranyl acetate, citronellyl actetate, carvyl acetate, fenchyl acetate, terpene sulphur compounds, 4-mentha-8-thiol-3-one, thiogeraniol, para-menth-1-ene-8-thiol, mercapto p-menthan-3-one, terpene hydrocarbons, such as D-limonene, L-limonene, alpha-pinene, beta-pinene, ocimene, alpha-terpinene, gamma-terpinene, beta-bisabolene, valencene, terpene oxides, such as 1,8-cineole, rose oxide, mint lactone, menthofuran, aromatic compounds, e.g. aromatic alcohols, such as benzyl alcohol, cinnamyl alcohol, 2-phenyl alcohol, aromatic aldehydes, such as benzaldehyde, cinnamic aldehyde, 5-methyl-2-phenylhexenal, salicylaldehyde, 4-hydroxy benzaldehyde, cyclamen aldehyde, 2-phenyl-2-butenal, aromatic acids, such as 2-phenyl acetic acid, cinnamic acid, aromatic esters such as benzyl acetate, benzyl salicylate, anisyl acetate, methyl phenyl acetate, methyl benzoate, methyl salicylate, methyl cinnamate, aromatic phenols, such as phenol, ortho-cresol, para-cresol, 2,3-dimethyl phenyl, 2-ethyl phenol, 2,3,5-trimethyl phenol, 4-vinyl phenol, guaiacol, 4-vinyl guaiacol, eugenol, thymol, carvacrol, aromatic sulphur compounds, such as thiophenol, diphenyl disulphide, aromatic nitrogen compounds, such as methyl anthranilate, methyl N-methyl anthranilate, aromatic ethers such as vanillin, ethylvanillin, anethol, aromatic oxides, such as heliotropine, diphenyl oxide, aromatic lactones, such as coumarin, dihydro coumarin, heterocyclic compounds, such as heterocyclic lactones, e.g. gamma butyrolactone, gamma-nonalactone, gamma decalactone, delta decalactone, jasmin lactone, delta dodecalactone, ambrettolide, heterocyclic furanes, such as furfuryl alcohol, furfural, 2-acetyl furan, theaspirane, 2-methyl tetrahydrofuran-3-one, furfuryl mercaptane, 2-methyl 3-furanthiol, 2-methyl 3-tetrahydro furanthiol, difurfuryl sulfide, difurfuryl disulfide, heterocyclic pyrans, such as maltol, ethyl maltole, rose oxide, maltol isobutyrate, heterocyclic pyrroles such as indole, 2-acetyle pyrrole, pyrrolidine, heterocyclic pyrazines, such as 2-methyl pyrazine, 2,3-dimethyl pyrazine, 2-methyl 3-ethyl pyrazine, trimethyl pyrazine, 2-acetyl pyrazine, 2-methoxy 3-methyl pyrazine, 2-methoxy 3-ethyl pyrazine, 2-methoxy 3-isobutyl pyrazine, 2-ethyl 3-methylthio pyrazine, heterocyclic thiazoles, such as thiazole, 2-methyl thiazole, 4-methyl 5-vinyl thiazole, 2-isobutyl thiazole, 2-acetyl thiazole,
- flavouring raw materials and flavouring preparations, e.g. essential oils, concretes, absolutes, extract or tinctures from raw materials such as citrus (e.g. lemon, lime, mandarine, bergamotte, grapefruit bitter orange, peel or essence oils), herbs (dill, parsley, cumin, rosemary, sage, clary sage, basil, tarragon, thyme, oregano, savoury, majoram, all spice, mace, nutmeg, clove leave, clove bud, caraway, cinnamom leaves, cinnamom bark, cassia, cardamom, ginger, galangal, turmeric, coriander seed, coriander leaf, fenugreek, juniper berry, wormwood, laurel leaves, eucalyptus, white pepper, green pepper, white pepper, carrot seed, celery seed, lovage leaf, asa foetida, onion, leek, garlic, mustard, horse radish, capsicum, paprika, sea weed, valerian oil, fir needle, spearmint, peppermint, wintergreen, buchu leaf, black currant buds, fennel, star anise, jambu, long pepper, davana, orris, mimosa, cassie, violet leaves, ho leaf, jasmin, ylang ylang, cananga, osmanthus, angelica, clary sage, ambrette seed, hops, camomile, lavender, rose, geranium, citronella, palmarosa, litsea cubeba, lemon grass, tagetes, neroli, petitgrain, mate, cognac oil, coffee, cola nut, cocoa, green tea, black tea, white tea, gentian, tolu balm, benzoe resin, peru balm, cascarilla, galbanum, vetiver, labdanum, patchouli, sandalwood, cedarwood, guaiac wood, oak wood, massoi bark, vanilla pods, tonka bean, as well as enriched fractions thereof, juice concentrates, such as orange juice, lemon juice, strawberry, cherry juice, or passion fruit juice concentrates, waterphases and recoveries from raw materials such as citrus (lemon, lime, orange, mandarine, grapefruit), apple, pear, quince, mispel, red fruits (raspberry, strawberry, blueberry, blackberry, Amellanchia (June plum), rose hip, cranberry, plum, prune, red and black currant, etc.) yellow fruits (peach, apricot, nectarine, banana, etc.), tropical fruits (mango, passionfruit, pineapple, lychee, etc.), vegetables (e.g. cucumber, tomato) and spices (e.g. ginger), acetophenone, allyl caproate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene phthalide, carvone, camphene, caryophyllene, cineol, cinnamyl acetate, citral, citronellol, citronellal, citronellyl acetate, cyclohexyl acetate, cymene, damascone, decalactone, dihydrocoumarin, dimethyl anthranilate, dodecalactone, ethoxyethyl acetate, ethylbutyric acid, ethyl butyrate, ethyl caprate, ethyl caproate, ethyl crotonate, ethylfuraneol, ethylguaiacol, ethylisobutyrate, ethylisovalerate, ethyl lactate, ethylmethyl butyrate, ethyl propionate, eucalyptol, eugenol, ethyl heptylate, 4-(p-hydroxyphenyl)-2-butanone, gamma-decalactone, geraniol, geranyl acetate, geranyl acetate, grapefruit aldehyde, methyl dihydrojasmonate (e.g. Hedion®), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenyl formate, cis-2-hexyl acetate, cis-3-hexyl acetate, trans-2-hexyl acetate, cis-3-hexyl formate, para-hydroxybenzyl acetone, isoamyl alcohol, isoamyl isovalerate, isobutyl butyrate, isobutyraldehyde, isoeugenol methyl ether, isopropyl methylthiazole, lauric acid, levulinic acid, linalool, linalool oxide, linalyl acetate, menthol, menthofuran, methyl anthranilate, methylbutanol, methylbutyric acid, 2-methylbutyl acetate, methyl caproate, methyl cinnamate, 5-methylfurfural, 3,2,2-methylcyclopentenolone, 6,5,2-methylheptenone, methyl dihydrojasmonate, methyl jasmonate, 2-methylmethyl butyrate, 2-methyl-2-pentenol acid, methylthiobutyrate, 3,1-methylthiohexanol, 3-methylthiohexyl acetate, nerol, nerol acetate, trans,trans-2,4-nonadienal, 2,4-nonadienol, 2,6-nonadienol, 2,4-nonadienol, nootkatone, delta-octalactone, gamma-octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl isovalerate, piperonal, propionaldehyde, propyl butyrate, pulegone, pulegol, sinensal, sulfurol, terpinene, terpineol, terpinolene, 8,3-s thiomenthanone, 4,4,2-thiomethylpentanone, thymol, delta-undecalactone, gamma-undecalactone, valencene, valeric acid, vanillin, acetoin, ethylvanillin, ethylvanillin isobutyrate (=3-ethoxy-4-isobutyryloxybenzaldehyde), 2,5-dimethyl-4-hydroxy-3 (2H)-furanone and derivatives thereof (here preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (here preferably ethyl maltol), coumarin and coumarin derivatives, gamma-lactones (here preferably gamma-undecalactone, gamma-nonalactone, gamma-decalactone), delta-lactones (here preferably 4-methyldeltadecalactone, massoilactone, deltadecalactone, tuberolactone), methyl sorbate, divanillin, 4-hydroxy-2(or 5)-ethyl-(or 2)-methyl-3 (2H) furanone, 2-hydroxy-3-methyl-2-cyclopentenone, 3-hydroxy-4,5-dimethyl-2(5H)-furanone, acetic acid isoamyl ester, butyric acid ethyl ester, butyric acid-n-butyl ester, butyric acid isoamyl ester, 3-methyl-butyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenylglycidate, ethyl-2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl)disulphide, furfurylmercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3 (2H)-furanone, guaiacol, 3-hydroxy-4,5-dimethyl-2(5H)-furanone, 3-hydroxy-4-methyl-5-ethyl-2 (5H)-furanone, cinnamaldehyde, cinnamon alcohol, methyl salicylate, isopulegol and (here not explicitly stated) stereoisomers, enantiomers, positional isomers, diastereomers, cis/trans isomers or epimers of these substances.

Yet another preferred embodiment of the present invention concerns a flavouring composition according to the present invention, wherein the composition additionally comprises d) at least one compound or compound mixture conveying a sweet taste, preferably selected from the group consisting of natural sweeteners, preferably naturally occurring sweet tasting substances, including plant extracts, such as sweet tasting carbohydrates (such as sucrose, trehalose, lactose, maltose, melizitose, melibiose, raffinose, palatinose, lactulose, D-fructose, D-glucose, D-galactose, 1-rhamnose, D-sorbose, D-mannose, D-tagatose, D-arabinose, 1-arabinose, D-ribose, D-glyceraldehyde, maltodextrin), sugar alcohols (such as erythritol, threitol, arabitol, ribitol, xylitol, sorbitol, mannitol, maltitol, isomaltit, dulcitol, lactitol), proteins (such as miraculin, pentaidin, monellin, thaumatin, curculin, brazzein, mabinlin), D-amino acids (such as D-phenylalanine, D-tryptophan) or extracts or fractions obtained from natural sources containing these amino acids and/or proteins and the physiologically acceptable salts of these amino acids and/or proteins, particularly the sodium, potassium, calcium or ammonium salts thereof; neohesperidindihydrochalkon, naringindihydrochalkon, steviolgylcoside, stevioside, steviolbiosid, rebaudioside, rebaudioside A, rebaudioside B, rebaudioside C, rebaudioside D, rebaudioside E, rebaudioside F, rebaudioside G, rebaudioside H, rebaudioside M, rebaudioside N, rebaudioside X, dulcoside, rubusoside, suavioside A, suavioside B, suavioside G, suavioside H, suavioside I, suavioside J, baiyunoside 1, baiyunoside 2, phlomisoside 1, phlomisoside 2, phlomisoside 3, phlomisoside 4, abrusoside A, abrusoside B, abrusoside C, abrusoside D, cyclocaryoside A, cyclocaryoside I, oslandin, polypodoside A, strogin 1, strogin, 2, strogin 4, selligueanin A, dihydroquercetin-3-acetate, perillartin, telosmosid A15, periandrin I-V, pterocaryoside, cyclocaryoside, mukurozioside, trans-Anethol, trans-cinnamaldehyd, bryoside, bryonoside, bryonodulcoside, carnosifloside, scandenoside, gypenoside, hematoxylin, cyanin, chlorogensäure, albiziasaponin, telosmoside, gaudichaudiosid, mogrosides, such as mogroside V, hernandulcine, monatin, glycyrrhetinic acid and its derivatives, particularly glycyrrhizin, preferably glycyrrhizin ammonium salt; extracts or enriched fractions of such extracts such as extracts of *Thaumatococcus* or *Stevia* ssp., particularly *Stevia rebaudiana*, swingle extracts, particularly *Momordica* or *Siratio grosvenorii* or Luo-Han-Guo, extracts of *Glycerrhyzia* ssp., particularly *Glycerrhyzia glabra*, extracts of *Rubus* ssp., particularly *Rubus suavissimus*, extracts of *Lippia dulcis*, extracts of *Mycetia balansae*, preferably comprising balansin A and/or balansin B;

synthetic sweeteners, preferably synthetic sweet tasting substances, preferably selected from the group consisting of magap, sodium cyclamate or other physiologically acceptable salts of cyclamic acid, acesulfam K; neohesperidindihydrochalcone, naringindihydrochalcone, saccharin, saccharin sodium salt, aspartam, superaspartam, neotam, alitam, advantam, perillartin, sucralose, lugduname, carrelame, sucrononate or sucrooctate or mixtures thereof.

"Conveying a sweet taste" in terms of the present invention, means that the substance(s) as described above is/are able to cause a sweet reaction at the taste buds on the tongue. Thus, the substance(s) as described above are counted to the substances, which have an inherent sweet taste.

One aspect of the present invention relates to a preparation containing a flavouring composition according to the invention, preferably wherein the flavouring composition is contained in an amount of from 0.01 wt.-% to 10 wt.-%, preferably in an amount of from 0.1 wt.-% to 5 wt.-%, more preferably in an amount of from 0.1 to 1 wt.-%, based on the total weight of the preparation.

Preferably, the preparation does not contain hesperetin and hesperetin dihydrochalcone besides the amounts resulting from the flavouring composition according to the invention. I.e., all hesperetin and hesperetin dihydrochalcone contained in the preparation preferably results from the flavouring composition according to the invention.

One preferred embodiment of the preparation according to the invention relates to a preparation, wherein the preparation is selected from the group consisting of preparations suitable for consumption, preferably a foodstuff, preparations for pleasure, beverages, semi-finished products and oral hygiene products.

Preferably, a preparation suitable for consumption may be selected from the group consisting of (reduced-calorie) baked goods (e.g. bread, dry biscuits, cakes, other baked articles), confectionery (e.g. muesli bar products, chocolates, chocolate bars, other products in bar form, fruit gums, dragées, hard and soft caramels, chewing gum), non-alcoholic drinks (e.g. cocoa, coffee, green tea, black tea, (green, black) tea drinks enriched with (green, black) tea extracts, rooibos tea, other herbal teas, fruit-containing soft drinks, isotonic drinks, refreshing drinks, nectars, fruit and vegetable juices, fruit or vegetable juice preparations), instant drinks (e.g. instant cocoa drinks, instant tea drinks, instant coffee drinks), meat products (e.g. ham, fresh sausage or raw sausage preparations, spiced or marinated fresh or salt meat products), eggs or egg products (dried egg, egg white, egg yolk), cereal products (e.g. breakfast cereals, muesli bars, precooked ready-to-eat rice products), dairy products (e.g. full-fat or reduced-fat or fat-free milk drinks, rice pudding, yoghurt, kefir, cream cheese, soft cheese, hard cheese, dried milk powder, whey, butter, buttermilk, ice-cream, partially or completely hydrolysed milk-protein-containing products), products made from soy protein or other soybean fractions (e.g. soy milk and products produced therefrom, drinks containing isolated or enzymatically treated soy protein, drinks containing soy flour, preparations containing soy lecithin, fermented products such as tofu or tempeh or products produced therefrom and mixtures with fruit preparations and optionally flavours), dairy-like preparations (milk-type, yoghurt-type, dessert-type, ice cream) from protein rich plant materials (e.g. from seed materials of oat, almond, pea, lupine, lentils, faba beans, chickpea, rice, canola), plant protein-enriched non-dairy drinks, fruit preparations (e.g. jams, sorbets, fruit sauces, fruit fillings), vegetable preparations (e.g. ketchup, sauces, dried vegetables, frozen vegetables, precooked vegetables, boiled-down vegetables), snacks (e.g. baked or fried potato crisps or potato dough products, maize- or groundnut-based extrudates), fat- and oil-based products or emulsions thereof (e.g. mayonnaise, remoulade, dressings, in each case full-fat or reduced-fat), other ready-made dishes and soups (e.g. dried soups, instant soups, precooked soups), spices, spice mixtures and in particular seasonings which are used, for example, in the snacks field, sweetener preparations, tablets or sachets, other preparations for sweetening or whitening drinks.

The preparation intended for consumption within the meaning of the invention can also be present as dietary supplements in the form of capsules, tablets (uncoated and coated tablets, e.g. gastro-resistant coatings), sugar-coated pills, granulates, pellets, solid mixtures, dispersions in liquid phases, as emulsions, as powders, as solutions, as pastes or as other formulations that can be swallowed or chewed.

In the present invention, oral hygiene products are understood to mean formulations commonly used by those skilled in the art for cleaning and caring for the oral cavity and pharynx and for freshening the breath. Known and common oral hygiene formulations are creams, gels, pastes, foams, emulsions, suspensions, aerosols, sprays as well as capsules, granules, pastilles, tablets, sweets or chewing gums, without this list of dosage forms being limiting with regard to the possible applications. Such formulations are used to clean and care for the tooth structure and oral cavity and to freshen the breath.

Oral hygiene products according to the invention are preferably selected from the group consisting of: Toothpastes, toothpastes, tooth gels, mouthwashes, mouth rinses, liquids for gargling, oral or pharyngeal sprays (pump or aerosol spray), lozenges, lozenges, candies, chewing gums, chewy candies and dental care chewing gums.

Another preferred embodiment of the preparation according to the present invention relates to a preparation according to the present invention, wherein the preparation additionally comprises one or more flavouring selected from the group consisting of aliphatic flavouring substances, especially saturated aliphatic alcohols, such as ethanol, isopronanol, butanol, isoamyl alcohol, hexanol, 2-heptanol, octanol (1/2/3), decanol, unsaturated aliphatic alcohols, such as cis-2 pentenol, cis-3 hexenol, trans-2 hexenol, trans-3 hexenol, cis-2 octenol, 1-octen-3-ol, cis-6 nonen-1-ol, trans-2, cis-6 nonadienol, aliphatic aldehydes such as saturated aliphatic aldehydes (e.g. acetaldehyde, propionaldehyde, butyraldehyde, isobutyraldehyde, valeraldehyde, isolvaleraldehyde, hexanal, 3-methyl hexanal, octanal, nonanal, or mono- or multi-unsaturated aliphatic aldehydes, such as 2-methyl but-2-enal, trans-2 hexenal, cis-3 hexenal, cis-4 hexenal, trans-2 octenal, trans-2 nonenal, cis-6 nonenal, trans-2, cis-6 nonadienal, trans 2 decenal, trans-2, trans-decadienal, aliphatic ketones, e.g. saturated ketones (such as 2-butanone, 2-pentanone, 2-heptanone, 2-octanone, 2-methylheptan-3-one, 2-decanone, 2-undecanone), unsaturated ketones (such as 1-penten-3-one, 1-hexen-3-one, 5-methyl-3-hexenone, 3-hepten-2-one, 1-octen-3-one, 2-octen-4-one, 3-octen-2-one, 3-none-2-one), aliphatic diketones and aliphatic diketoles, e.g. diacetyl, acetyl methyl carbinol, 2,3-hexanedione, aliphatic acids, such as straight-chain saturated acids, such as acetic acid, propionic acid, butyric acid, isobutyric acid, valeric acid, heptanoic acid, octanoic acid, decanoic acid, branched-chain saturated acids, such as 2-methyl heptanoic acid, 4-ethyl octanoic acid, and unsaturated acids, such as 2-butenoic acid, 2-pentenoic acid, 4-pentenoic acid, 2-methyl pentenoic acid, trans-3 hexenoic acid, cis-3 hexenoic acid, 3-octenoic acid, linoleic acid), aliphatic esters, such as saturated esters, e.g. methyl acetate, methylbutyrate, methyl-2-methylbutyrate, methyl hexanoate, ethylacetate, ethylbutyrate, ethyl-2-methylbutyrate, ethyl-3-methylbutyrate, ethyl hexanoate, ethyl decanoate, isopropyl acetate, isobutyl acetate, isobutyl valerate, isoamyl acetate, isoamyl butyrate, isoamyl isovalerate, hexyl acetate, hexyl hexanoate, 3-octyl acetate and unsaturated esters, such as methyl 2-hexenoate, allyl hexanoate, cis-3 hexenyl acetate, cis-3 hexenyl butyrate, aliphatic thiols and dithiols (e.g. propane thiol, allyl mercaptan, 1-methoxy-3-methylbutane-3-thiol, dimethyl sulfide, dimethyl trisulfide, dipropyl sulfide, diallyl trisulfide, other aliphatic sulfur compounds, such as 2-mercapto-3-butanol, methyl thio propanal, 3-mercapto-pentanone, 4-methoxy-2-methyl-2-mercaptobutanone, methyl thiobutyrate, methyl thiobutyrate, methyl 3-methylthiopropionate, aliphatic nitrogen compounds, such as butyl amine, trimethyl amine, allyl isothiocyanate, isopropyl isothiocyanate, alicyclic compounds, such as alicyclic ketones, e.g. cis-jasmone, isophorone, 4-ketoisophorone, alicyclic esters such as methyl jasmonate, hedione, terpenes, e.g. terpene alcohols, such as linalool, citronellol, geraniol, nerol, alpha terpineol, menthol, 8-p-menthene-1,2-diol, fenchol, borneol, nerolidol, hotrienol, terpene aldehydes such as geranial, neral, citronellal, beta-sinensal, terpene ketones, such as alpha-ionone, (D)-carvone, (L)-carvone, nootkatone, piperitone, menthone, alpha damascone, beta damascene, damascenone, terpene esters, such as linalyl acetate, geranyl acetate, citronellyl actetate, carvyl acetate, fenchyl acetate, terpene sulphur compounds, 4-mentha-8-thiol-3-one, thiogeraniol, para-menth-1-ene-8-thiol, mercapto p-menthan-3-one, terpene hydrocarbons, such as D-limonene, L-limonene, alpha-pinene, beta-pinene, ocimene, alpha-terpinene, gamma-terpinene, beta-bisabolene, valencene, terpene oxides, such as 1,8-cineole, rose oxide, mint lactone, menthofuran, aromatic compounds, e.g. aromatic alcohols, such as benzyl alcohol, cinnamyl alcohol, 2-phenyl alcohol, aromatic aldehydes, such as benzaldehyde, cinnamic aldehyde, 5-methyl-2-phenylhexenal, salicylaldehyde, 4-hydroxy benzaldehyde, cyclamen aldehyde, 2-phenyl-2-butenal, aromatic acids, such as 2-phenyl acetic acid, cinnamic acid, aromatic esters such as benzyl acetate, benzyl salicylate, anisyl acetate, methyl phenyl acetate, methyl benzoate, methyl salicylate, methyl cinnamate, aromatic phenols, such as phenol, ortho-cresol, para-cresol, 2,3-dimethyl phenyl, 2-ethyl phenol, 2,3,5-trimethyl phenol, 4-vinyl phenol, guaiacol, 4-vinyl guaiacol, eugenol, thymol, carvacrol, aromatic sulphur compounds, such as thiophenol, diphenyl disulphide, aromatic nitrogen compounds, such as methyl anthranilate, methyl N-methyl anthranilate, aromatic ethers such as vanillin, ethylvanillin, anethol, aromatic oxides, such as heliotropine, diphenyl oxide, aromatic lactones, such as coumarin, dihydro coumarin, heterocyclic compounds, such as heterocyclic lactones, e.g. gamma butyrolactone, gamma-nonalactone, gamma decalactone, delta decalactone, jasmin lactone, delta dodecalactone, ambrettolide, heterocyclic furanes, such as furfuryl alcohol, furfural, 2-acetyl furan, theaspirane, 2-methyl tetrahydrofuran-3-one, furfuryl mercaptane, 2-methyl 3-furanthiol, 2-methyl 3-tetrahydro furanthiol, difurfuryl sulfide, difurfuryl disulfide, heterocyclic pyrans, such as maltol, ethyl maltole, rose oxide, maltol isobutyrate, heterocyclic pyrroles such as indole, 2-acetyle pyrrole, pyrrolidine, heterocyclic pyrazines, such as 2-methyl pyrazine, 2,3-dimethyl pyrazine, 2-methyl 3-ethyl pyrazine, trimethyl pyrazine, 2-acetyl pyrazine, 2-methoxy 3-methyl pyrazine, 2-methoxy 3-ethyl pyrazine, 2-methoxy 3-isobutyl pyrazine, 2-ethyl 3-methylthio pyrazine, heterocyclic thiazoles, such as thiazole, 2-methyl thiazole, 4-methyl 5-vinyl thiazole, 2-isobutyl thiazole, 2-acetyl thiazole, flavouring raw materials and flavouring preparations, e.g. essential oils, concretes, absolutes, extract or tinctures from raw materials such as citrus (e.g. lemon, lime, mandarine, bergamotte, grapefruit bitter orange, peel or essence oils), herbs (dill, parsley, cumin, rosemary, sage, clary sage, basil, tarragon, thyme, oregano, savoury, majoram, all spice, mace, nutmeg, clove leave, clove bud, caraway, cinnamom leaves, cinnamom bark, cassia, cardamom, ginger, galangal, turmeric, coriander seed, coriander leaf, fenugreek, juniper berry, wormwood, laurel leaves, eucalyptus, white pepper, green pepper, white pepper, carrot seed, celery seed, lovage leaf, asa foetida, onion, leek, garlic, mustard, horse radish, capsicum, paprika, sea weed, valerian oil, fir needle, spearmint, peppermint, wintergreen, buchu leaf, black currant buds, fennel, star anise, jambu, long pepper, davana, orris, mimosa, cassie, violet leaves, ho leaf, jasmin, ylang ylang, cananga, osmanthus, angelica, clary sage, ambrette seed, hops, camomile, lavender, rose, geranium, citronella, palmarosa, litsea cubeba, lemon grass, tagetes, neroli, petitgrain, mate, cognac oil, coffee, cola nut, cocoa, green tea, black tea, white tea, gentian, tolu balm, benzoe resin, peru balm, cascarilla, galbanum, vetiver, labdanum, patchouli, sandalwood, cedarwood, guaiac wood, oak wood, massoi bark, vanilla pods, tonka bean, as well as enriched fractions thereof, juice concentrates, such as orange juice, lemon juice, strawberry, cherry juice, or passion fruit juice concentrates, waterphases and recoveries from raw materials such as citrus (lemon, lime, orange, mandarine, grapefruit), apple, pear, quince, mispel, red fruits (raspberry, strawberry, blueberry, blackberry, Amellanchia (June plum), rose hip, cranberry, plum, prune, red and black currant, etc.) yellow fruits (peach, apricot, nectarine, banana, etc.), tropical fruits (mango, passionfruit, pineapple, lychee, etc.), vegetables (e.g. cucumber, tomato) and spices (e.g. ginger), acetophenone, allyl caproate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene phthalide, carvone, camphene, caryophyllene, cineol, cinnamyl acetate, citral, citronellol, citronellal, citronellyl acetate, cyclohexyl acetate, cymene, damascone, decalactone, dihydrocoumarin, dimethyl anthranilate, dodecalactone, ethoxyethyl acetate, ethylbutyric acid, ethyl butyrate, ethyl caprate, ethyl caproate, ethyl crotonate, ethylfuraneol, ethylguaiacol, ethylisobutyrate, ethylisovalerate, ethyl lactate, ethylmethyl butyrate, ethyl propionate, eucalyptol, eugenol, ethyl heptylate, 4-(p-hydroxyphenyl)-2-butanone, gamma-decalactone, geraniol, geranyl acetate, geranyl acetate, grapefruit aldehyde, methyl dihydrojasmonate (e.g. Hedion®), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenyl formate, cis-2-hexyl acetate, cis-3-hexyl acetate, trans-2-hexyl acetate, cis-3-hexyl formate, para-hydroxybenzyl acetone, isoamyl alcohol, isoamyl isovalerate, isobutyl butyrate, isobutyraldehyde, isoeugenol methyl ether, isopropyl methylthiazole, lauric acid, levulinic acid, linalool, linalool oxide, linalyl acetate, menthol, menthofuran, methyl anthranilate, methylbutanol, methylbutyric acid, 2-methylbutyl acetate, methyl caproate, methyl cinnamate, 5-methylfurfural, 3,2,2-methylcyclopentenolone, 6,5,2-methylheptenone, methyl dihydrojasmonate, methyl jasmonate, 2-methylmethyl butyrate, 2-methyl-2-pentenol acid, methylthiobutyrate, 3,1-methylthiohexanol, 3-methylthiohexyl acetate, nerol, nerol acetate, trans,trans-2,4-nonadienal, 2,4-nonadienol, 2,6-nonadienol, 2,4-nonadienol, nootkatone, delta-octalactone, gamma-octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl isovalerate, piperonal, propionaldehyde, propyl butyrate, pulegone, pulegol, sinensal, sulfurol, terpinene, terpineol, terpinolene, 8,3-s thiomenthanone, 4,4,2-thiomethylpentanone, thymol, delta-undecalactone, gamma-undecalactone, valencene, valeric acid, vanillin, acetoin, ethylvanillin, ethylvanillin isobutyrate (=3-ethoxy-4-isobutyryloxybenzaldehyde), 2,5-dimethyl-4-hydroxy-3 (2H)-furanone and derivatives thereof (here preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (here preferably ethyl maltol), coumarin and coumarin derivatives, gamma-lactones (here preferably gamma-undecalactone, gamma-nonalactone, gamma-decalactone), delta-lactones (here preferably 4-methyldeltadecalactone, massoilactone, deltadecalactone, tuberolactone), methyl sorbate, divanillin, 4-hydroxy-2(or 5)-ethyl-(or 2)-methyl-3 (2H) furanone, 2-hydroxy-3-methyl-2-cyclopentenone, 3-hydroxy-4,5-dimethyl-2(5H)-furanone, acetic acid isoamyl ester, butyric acid ethyl ester, butyric acid-n-butyl ester, butyric acid isoamyl ester, 3-methyl-butyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenylglycidate, ethyl-2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl)disulphide, furfurylmercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3 (2H)-furanone, guaiacol, 3-hydroxy-4,5-dimethyl-2(5H)-furanone, 3-hydroxy-4-methyl-5-ethyl-2 (5H)-furanone, cinnamaldehyde, cinnamon alcohol, methyl salicylate, isopulegol and (here not explicitly stated) stereoisomers, enantiomers, positional isomers, diastereomers, cis/trans isomers or epimers of these substances.

Another embodiment of the preparation according to the present invention concerns a preparation according to the present invention, wherein the preparation additionally comprises at least one compound or compound mixture conveying a sweet taste, preferably selected from the group consisting of natural sweeteners, preferably naturally occurring sweet tasting substances, including plant extracts, such as sweet tasting carbohydrates (such as sucrose, trehalose, lactose, maltose, melizitose, melibiose, raffinose, palatinose, lactulose, D-fructose, D-glucose, D-galactose, 1-rhamnose, D-sorbose, D-mannose, D-tagatose, D-arabinose, 1-arabinose, D-ribose, D-glyceraldehyde, maltodextrin), sugar alcohols (such as erythritol, threitol, arabitol, ribitol, xylitol, sorbitol, mannitol, maltitol, isomaltit, dulcitol, lactitol), proteins (such as miraculin, pentaidin, monellin, thaumatin, curculin, brazzein, mabinlin), D-amino acids (such as D-phenylalanine, D-tryptophan) or extracts or fractions obtained from natural sources containing these amino acids and/or proteins and the physiologically acceptable salts of these amino acids and/or proteins, particularly the sodium, potassium, calcium or ammonium salts thereof; neohesperidindihydrochalkon, naringindihydrochalkon, steviolgylcoside, stevioside, steviolbiosid, rebaudioside, rebaudioside A, rebaudioside B, rebaudioside C, rebaudioside D, rebaudioside E, rebaudioside F, rebaudioside G, rebaudioside H, rebaudioside M, rebaudioside N, rebaudioside X, dulcoside, rubusoside, suavioside A, suavioside B, suavioside G, suavioside H, suavioside 1, suavioside J, baiyunoside 1, baiyunoside 2, phlomisoside 1, phlomisoside 2, phlomisoside 3, phlomisoside 4, abrusoside A, abrusoside B, abrusoside C, abrusoside D, cyclocaryoside A, cyclocaryoside 1, oslandin, polypodoside A, strogin 1, strogin, 2, strogin 4, selligueanin A, dihydroquercetin-3-acetate, perillartin, telosmosid A15, periandrin 1-V, pterocaryoside, cyclocaryoside, mukurozioside, trans-Anethol, trans-cinnamaldehyd, bryoside, bryonoside, bryonodulcoside, carnosifloside, scandenoside, gypenoside, hematoxylin, cyanin, chlorogensäure, albiziasaponin, telosmoside, gaudichaudiosid, mogrosides, such as mogroside V, hernandulcine, monatin, glycyrrhetinic acid and its derivatives, particularly glycyrrhizin, preferably glycyrrhizin ammonium salt; extracts or enriched fractions of such extracts such as extracts of *Thaumatococcus* or *Stevia* ssp., particularly *Stevia rebaudiana*, swingle extracts, particularly *Momordica* or *Siratio grosvenorii* or Luo-Han-Guo, extracts of *Glycerrhyzia* ssp., particularly *Glycerrhyzia glabra*, extracts of *Rubus* ssp., particularly *Rubus suavissimus*, extracts of *Lippia dulcis*, extracts of *Mycetia balansae*, preferably comprising balansin A and/or balansin B;

synthetic sweeteners, preferably synthetic sweet tasting substances, preferably selected from the group consisting of magap, sodium cyclamate or other physiologically acceptable salts of cyclamic acid, acesulfam K; neohesperidindihydrochalcone, naringindihydrochalcone, saccharin, saccharin sodium salt, aspartam, superaspartam, neotam, alitam, advantam, perillartin, sucralose, lugduname, carrelame, sucrononate or sucrooctate or mixtures thereof.

Another aspect of the present invention relates to the use of a flavouring composition according to the invention for improving at least one taste characteristic in/of a preparation, preferably wherein hesperetin is contained in an amount of from 0.1 to 20 ppm, preferably of from 0.5 to 15 ppm, more preferably in an amount of from 1 to 10 ppm, and hesperetin dihydrochalcone is contained in an amount of from 1 to 30 ppm, preferably of from 2.5 to 20 ppm, more preferably in an amount of from 6 to 15 ppm, based on the total weight of the preparation.

Surprisingly it was found that with the dosing regimen as described above, it was possible to balance the taste profile of the preparation as described above. A dosing outside of these ranges showed either no (or no sufficient) desired effect or non-desired off-tastes. It was observed that hesperetin concentrations of more than 30 ppm exhibit off-tastes in the preparation.

Preferably, the preparation for which the at least one taste characteristic is to be improved does not contain hesperetin and hesperetin dihydrochalcone at all. I.e., all hesperetin and hesperetin dihydrochalcone contained in the final preparation preferably results from the flavouring composition according to the invention.

One embodiment of the use according to the invention concerns the use of a flavouring composition according to the invention, wherein the at least one taste characteristic(s) is/are selected from the group consisting of richness, body, authenticity, impact, mouthfeel, sweetness and juiciness.

All of the taste impressions, as described above, are common taste impressions used by panellists to describe taste impressions and are thus known to the skilled person. To determine whether such a desired taste impression (or preferably any taste impression) is improved or enhanced, simple testing (usually in duplicates, preferably in triplicates) performed by panellists may be applied, in which the panellists evaluate e.g. samples with and samples without hesperetin and hesperetin dihydrochalcone and/or different samples with varying amounts of hesperetin and hesperetin dihydrochalcone.

Yet another aspect of the present invention concerns a method for improving at least one taste characteristic in/of a preparation, comprising or consisting of the steps a) providing at least one preparation, preferably selected from the group consisting of preparations suitable for consumption, preferably a foodstuff, preparations for pleasure, beverages, semi-finished products and oral hygiene products;
b) providing a flavouring composition according to the invention;
c) contacting and mixing the preparation provided in step a) and the flavouring composition provided in step b);
d) obtaining a preparation as defined herein.

Preferably, the preparation provided in step a) does not contain hesperetin and hesperetin dihydrochalcone at all. I.e., all hesperetin and hesperetin dihydrochalcone contained in the final preparation preferably results from the flavouring composition according to the invention.

One embodiment of the method according to the invention relates to a method, wherein the flavouring composition provided in step b) is provided in an amount of from 0.01 wt.-% to 10 wt.-%, preferably in an amount of from 0.1 wt.-% to 5 wt.-%, more preferably in an amount of from 0.1 to 1 wt.-%, based on the total weight of the preparation.

The invention is further characterized by illustrative, non-limiting examples.

EXAMPLES

Figure 1:
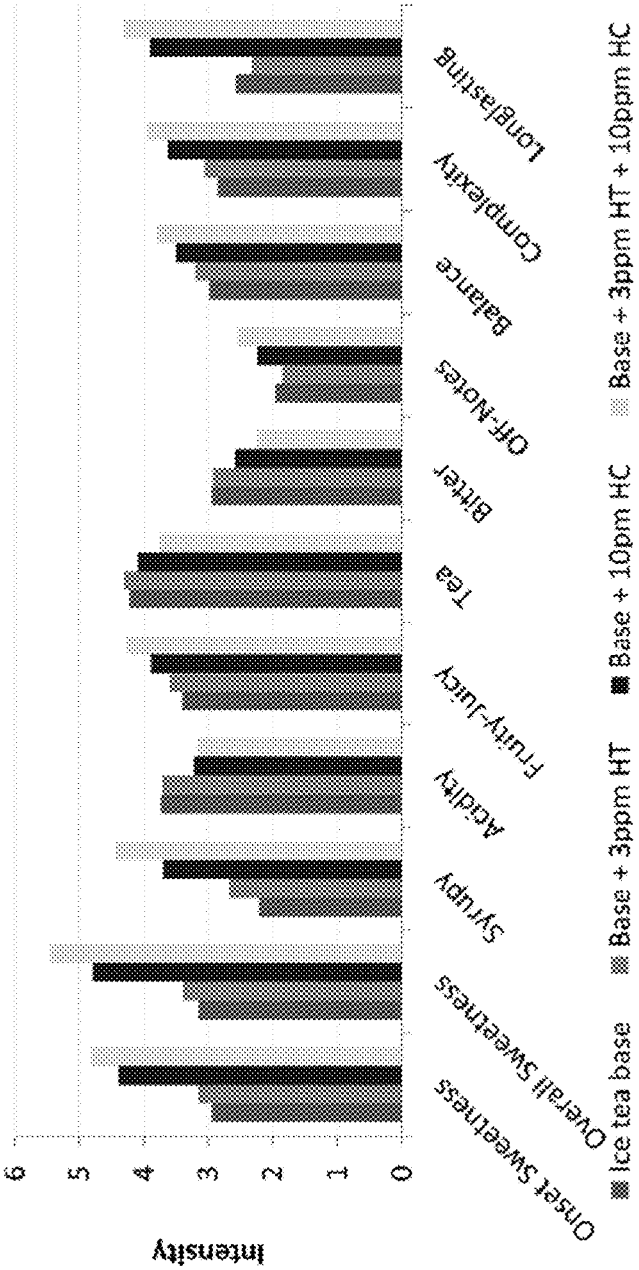
FIG. 1: Depiction of the sensory results of preparations with different dosing regimens of hesperetin and hesperetin dihydrochalcone according to Example 2 (HT/HC ratio 1:3.33).

Example 1: Taste Modulation in Different Bases

Based on an experimental design, 86 ice tea prototypes (drinkable preparations) were created that systematically varied regarding different sources of sweetness conveyed by sugars (e.g. HFCS, invert sugar syrup), sweeteners (Reb A, Reb D, Reb M, sucralose, acesulfame K) as well as hesperetin dihydrochalcone (HC) and hesperetin (HT) (the results are depicted in Table 1).

In order to investigate the effect of HT and HC on perceived sweetness dimensions, the 86 samples were profiled (sensory descriptive analysis) by a trained expert panel consisting of 12 panelists. The panelists were trained on an ice tea language with focus on sweetness attributes. Each attribute was scored on an unstructured line scale (10 cm) for its perceived intensity. To ensure high data reliability, every sample was tested twice. The sweetness attributes "sweetness on-set", "sweetness overall intensity" and "sweetness long-lastingness" were aggregated to a so-called sweetness factor using factor analysis (principal component analysis with VARI MAX rotation). The sweetness factor score runs from neg. infinity to positive infinity. By applying statistical modelling (JMP software: fit model: standard least squares, Analysis of Variance: DF 86, F 19.6907, $p<0.0001$; Rsquare 0.972) all significant main and two-way interaction effects were identified amongst which HC ($p<0.0001$), HT ($p<0.0001$) and the interaction of HC and HT ($p<0.0001$) were identified. These main and interaction effects were further tested in different bases (see table 1) using ANOVA, $p<0.05$; post hoc test: LSD. Table 1 shows that the interaction of HC and HT had the strongest positive effect on the sweetness factor followed by HC main effect and HT main effect coming third having the smallest positive effect (all sign. $p<0.0001$). Samples sharing the same letter are not significantly different.

TABLE 1

Results of the variance analysis of different samples.

| Sample | Added sugar/ sweetener | Hesperetin dihydrochalcone (ppm) | Hesperetin (ppm) | ANOVA | sign. differences |
|---|---|---|---|---|---|
| Sugar Free Ice tea Base | — | 0 | 0 | −3.7 | a |
| | | 10 | 0 | −1.3 | b |
| | | 0 | 3 | −3.6 | a |
| | | 10 | 3 | −0.9 | c |
| Invert Sugar Syrup Ice tea Base | 2 wt. % Invert sugar syrup | 0 | 0 | −3.4 | a |
| | | 10 | 0 | −1 | b |
| | | 0 | 3 | −3.3 | a |
| | | 10 | 3 | −0.5 | c |
| HFCS Ice tea Base | 2 wt. % High Fructose corn sirup | 0 | 0 | −3.3 | a |
| | | 10 | 0 | −0.9 | b |
| | | 0 | 3 | −3.2 | a |
| | | 10 | 3 | −0.4 | c |
| Reb A Ice tea Base | 60 ppm rebaudioside A | 0 | 0 | −2.9 | a |
| | | 10 | 0 | −0.5 | b |
| | | 0 | 3 | −2.8 | a |
| | | 10 | 3 | −0.1 | c |
| Reb A/Reb M Ice tea Base | 60 ppm rebaudioside A/45 ppm rebaudioside M | 0 | 0 | −2.4 | a |
| | | 10 | 0 | 0 | b |
| | | 0 | 3 | −2.3 | a |
| | | 10 | 3 | 0.5 | c |
| Reb A/Reb D Ice tea Base | 60 ppm rebaudioside A/60 ppm rebaudioside D | 0 | 0 | −2.5 | a |
| | | 10 | 0 | −0.1 | b |
| | | 0 | 3 | −2.4 | a |
| | | 10 | 3 | 0.4 | c |
| Reb M/Reb D Ice tea Base | | 0 | 0 | −2.7 | a |
| | 45 ppm rebaudioside M/60 ppm rebaudioside D | 10 | 0 | −0.3 | b |
| | | 0 | 3 | −2.6 | a |
| | | 10 | 3 | 0.1 | c |
| Sucralose Ice tea Base | 100 ppm sucralose | 0 | 0 | −3.2 | a |
| | | 10 | 0 | −0.8 | b |
| | | 0 | 3 | −3.1 | a |
| | | 10 | 3 | −0.3 | c |
| Acesulfame K Ice tea Base | 60 ppm | 0 | 0 | −2.5 | a |
| | | 10 | 0 | −0.1 | b |
| | | 0 | 3 | −2.4 | a |
| | | 10 | 3 | 0.4 | c |

Figure 2:
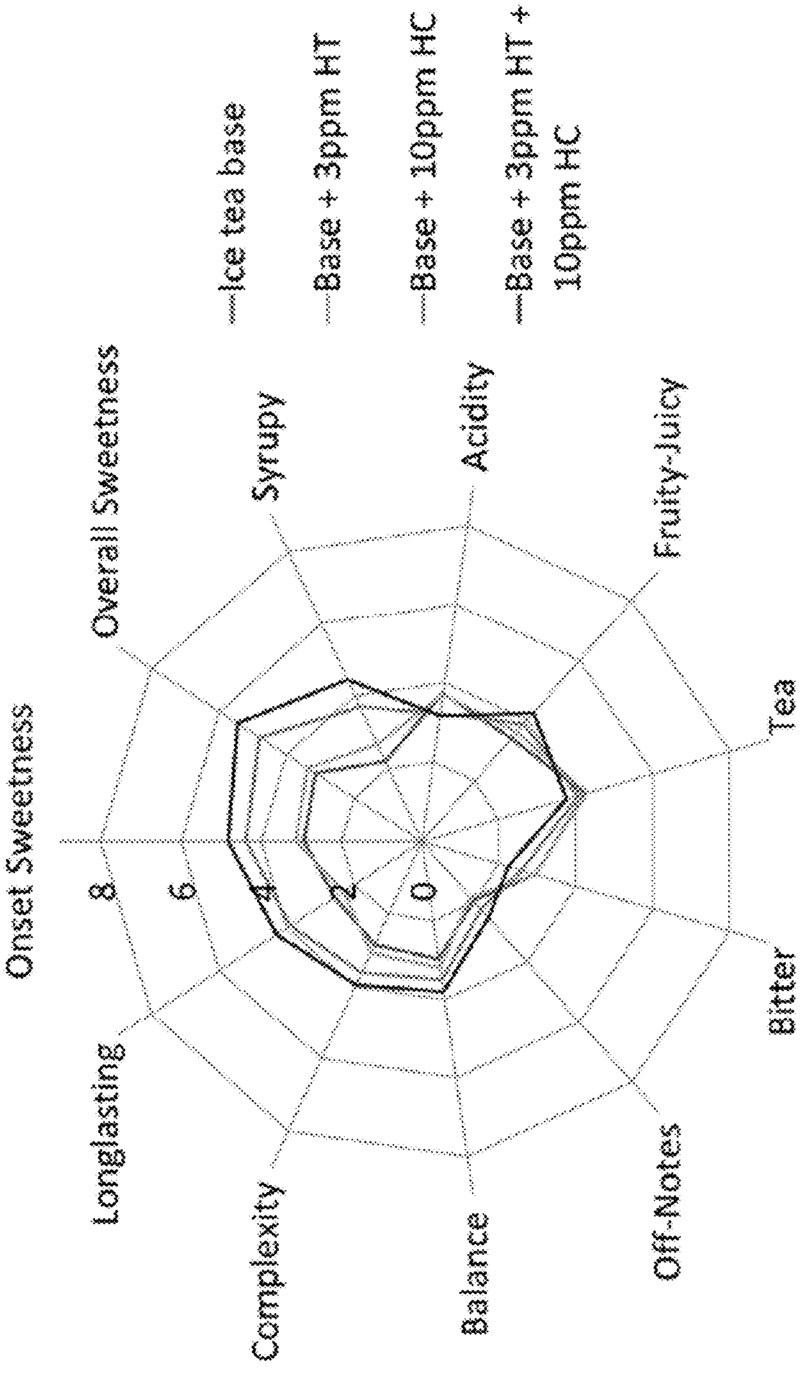
FIG. 2: Network diagram of the sensory results of Example 2.

Example 2: Influence of the Dosing of Hesperetin Dihydrochalcone and Hesperetin on Different Taste Aspects In order to further validate the insights derived from Example 1, the interaction and main effects of HT and HC are to be shown in a setup in which a drinkable preparation with a tea base, 0.05 wt.-% lemon flavor, 4 wt.-% high fructose corn syrup, 0.1 wt.-% citric acid and 0.03 wt.-% trisodium citrate was prepared. That preparation was divided into four samples by varying the dosage of HC and HT resulting in one sample containing no HC and no HT (control), containing 10 ppm HC and no HT (HC main effect), containing no HC and 3 ppm HT (HT main effect) and, respectively, containing 10 ppm HC and 3 ppm HT (HT×HC interaction effect). This resulted in a ratio of HT to HC of 1:3.33. The final preparations were profiled by an expert panel consisting of ten educated panelists (two measurements). Different sensorial attributes (ice tea language with focus on sweetness) were assessed and scored on an unstructured line scale (10 cm) for its perceived intensity. The results of the testing are shown below in Table 2 as well as in FIG. 1 and FIG. 2.

TABLE 2

Sensory evaluation results

| Tea Base [wt.-%] | Lemon Flavor [wt.-%] | HFCS [wt.-%] | Citric Acid [wt.-%] | Trisodium citrate [wt.-%] | HT [ppm] | HC [ppm] | Onset Sweetness | Overall Sweetness | Syrupy | Acidity |
|---|---|---|---|---|---|---|---|---|---|---|
| 0.30 | 0.05 | 4 | 0.10 | 0.03 | 0 | 0 | 2.94 | 3.15 | 2.20 | 3.73 |
| 0.30 | 0.05 | 4 | 0.10 | 0.03 | 3 | 0 | 3.14 | 3.39 | 2.67 | 3.71 |
| 0.30 | 0.05 | 4 | 0.10 | 0.03 | 0 | 10 | 4.39 | 4.80 | 3.70 | 3.22 |
| 0.30 | 0.05 | 4 | 0.10 | 0.03 | 3 | 10 | 4.82 | 5.45 | 4.44 | 3.17 |

| Tea Base [wt.-%] | Lemon Flavor [wt.-%] | HFCS [wt.-%] | Citric Acid [wt.-%] | Trisodium citrate [wt.-%] | HT [ppm] | HC [ppm] | Fruity-Juicy | Tea | Bitter | Off-Notes |
|---|---|---|---|---|---|---|---|---|---|---|
| 0.30 | 0.05 | 4 | 0.10 | 0.03 | 0 | 0 | 3.40 | 4.23 | 2.94 | 1.96 |
| 0.30 | 0.05 | 4 | 0.10 | 0.03 | 3 | 0 | 3.60 | 4.30 | 2.93 | 1.85 |
| 0.30 | 0.05 | 4 | 0.10 | 0.03 | 0 | 10 | 3.88 | 4.08 | 2.58 | 2.25 |
| 0.30 | 0.05 | 4 | 0.10 | 0.03 | 3 | 10 | 4.25 | 3.76 | 2.25 | 2.53 |

| Tea Base [wt.-%] | Lemon Flavor [wt.-%] | HFCS [wt.-%] | Citric Acid [wt.-%] | Trisodium citrate [wt.-%] | HT [ppm] | HC [ppm] | Balance | Complexity | Longlasting | Remarks |
|---|---|---|---|---|---|---|---|---|---|---|
| 0.30 | 0.05 | 4 | 0.10 | 0.03 | 0 ppm | 0 ppm | 2.98 | 2.85 | 2.57 | |
| 0.30 | 0.05 | 4 | 0.10 | 0.03 | 3 ppm | 0 ppm | 3.20 | 3.06 | 2.32 | |
| 0.30 | 0.05 | 4 | 0.10 | 0.03 | 0 ppm | 10 ppm | 3.50 | 3.62 | 3.90 | lingering, sweetener |
| 0.30 | 0.05 | 4 | 0.10 | 0.03 | 3 ppm | 10 ppm | 3.80 | 3.94 | 4.31 | pineapple |

Example 3: Dosing Tests with an Excess of Hesperetin

Figure 3:
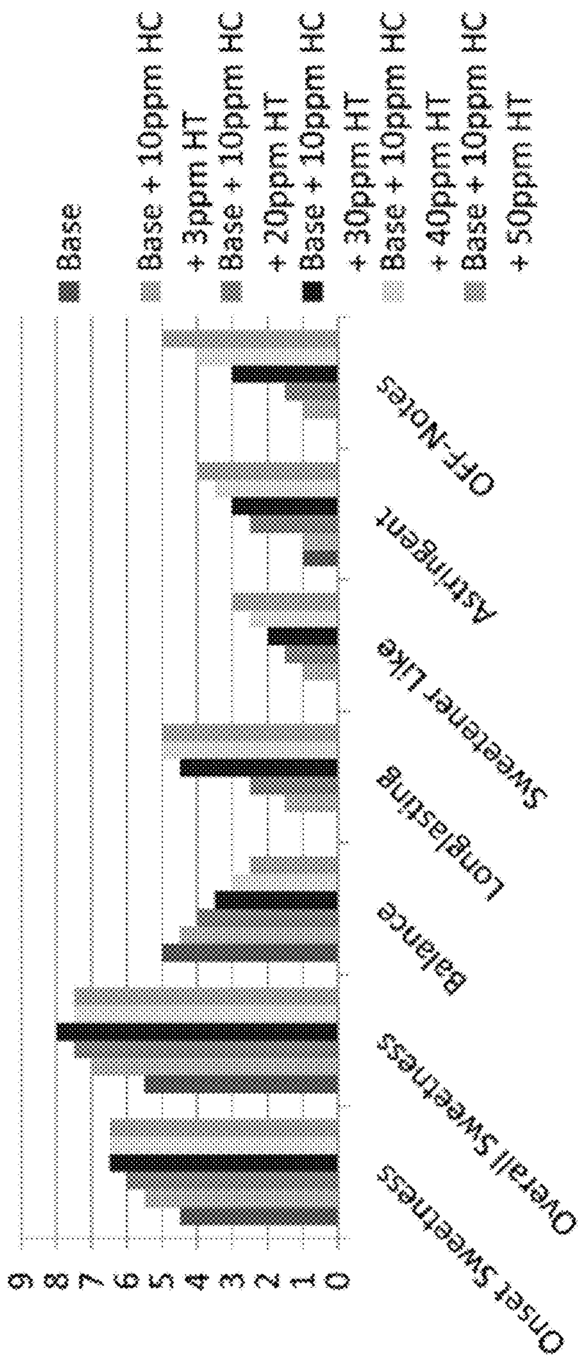
FIG. 3: Sensory results of preparations having an excess of hesperetin in comparison to hesperetin dihydrochalcone.
Figure 4:
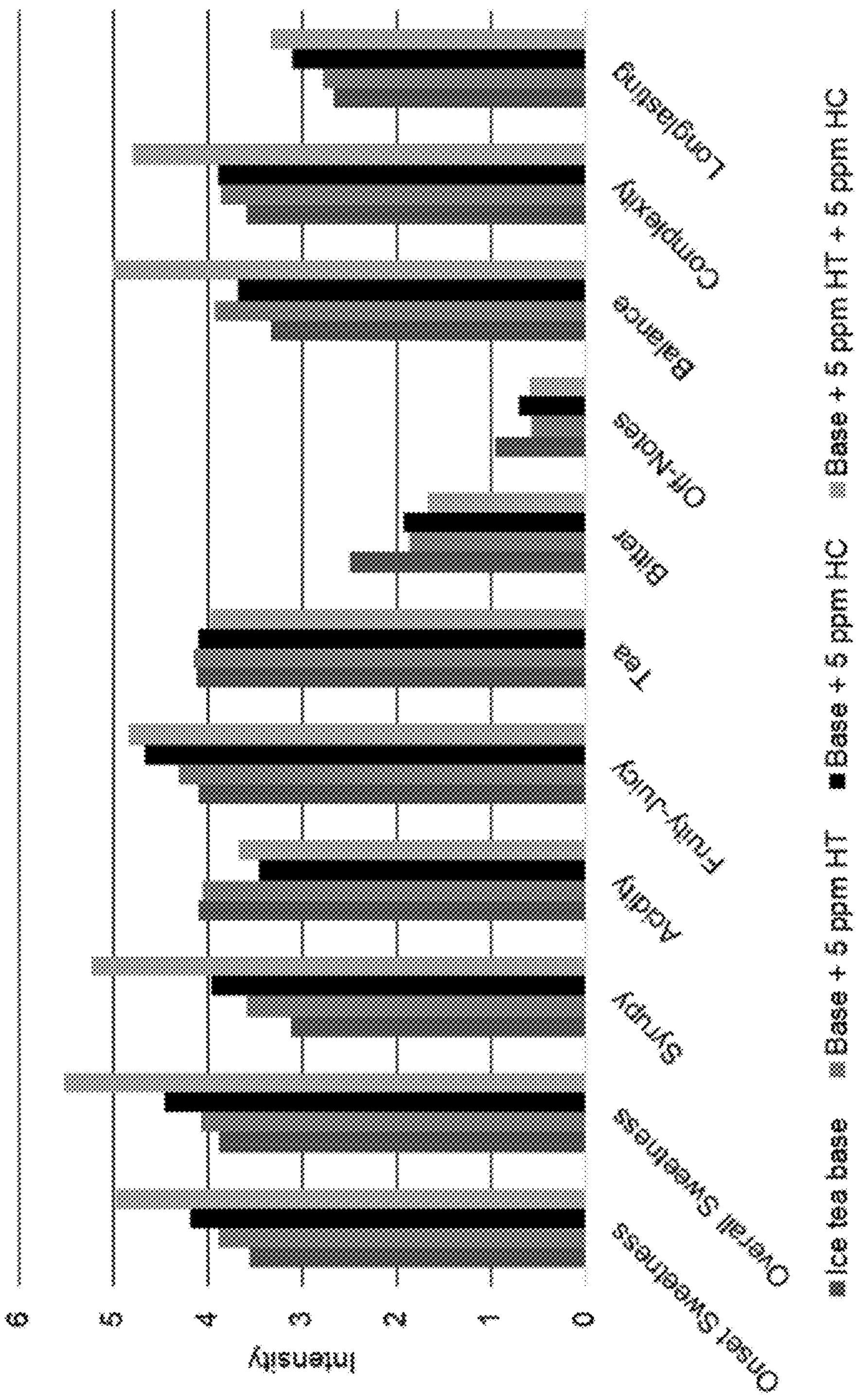
FIG. 4: Depiction of the sensory results of preparations with different dosing regimens of hesperetin and hesperetin dihydrochalcone according to Example 4 (HT/HC ratio 1:1).
Figure 5:
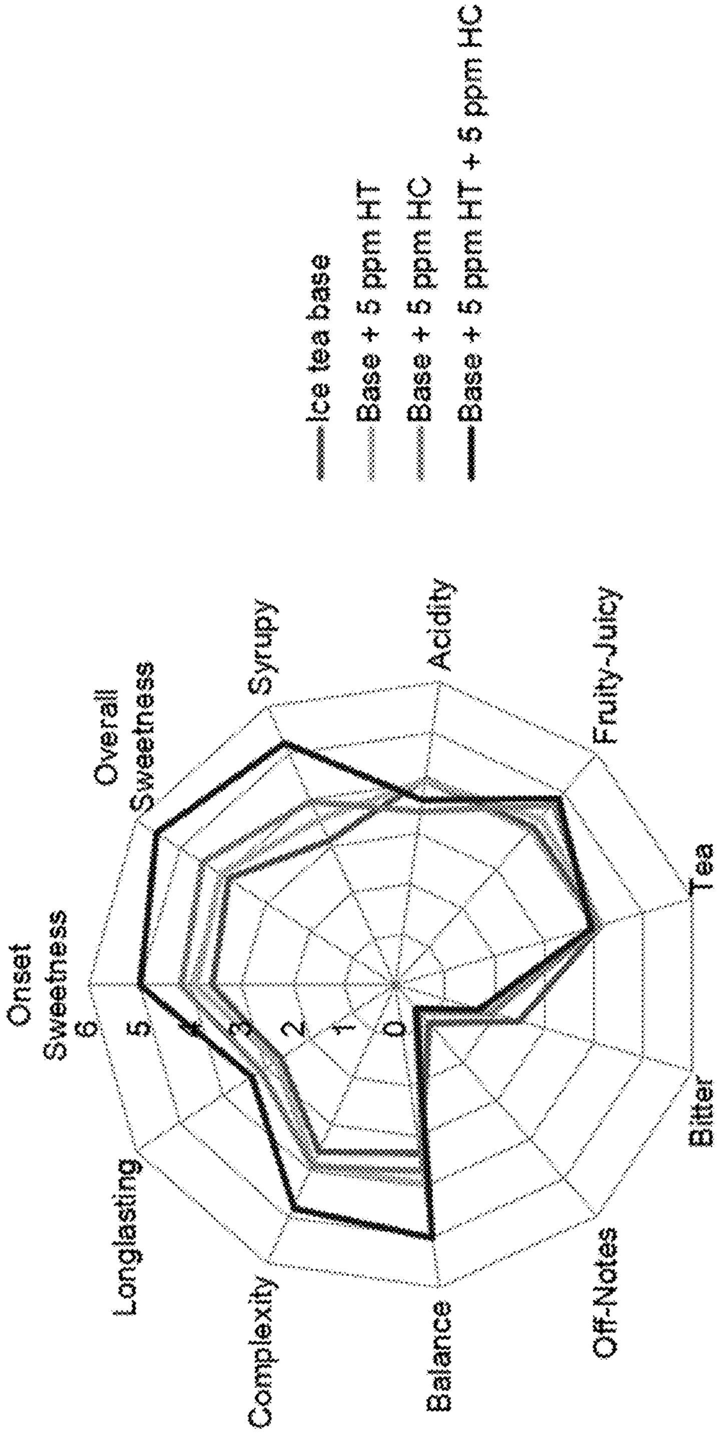
FIG. 5: Network diagram of the sensory results of Example 4 for the dosing ration 1:1 HT/HC.
Figure 6:
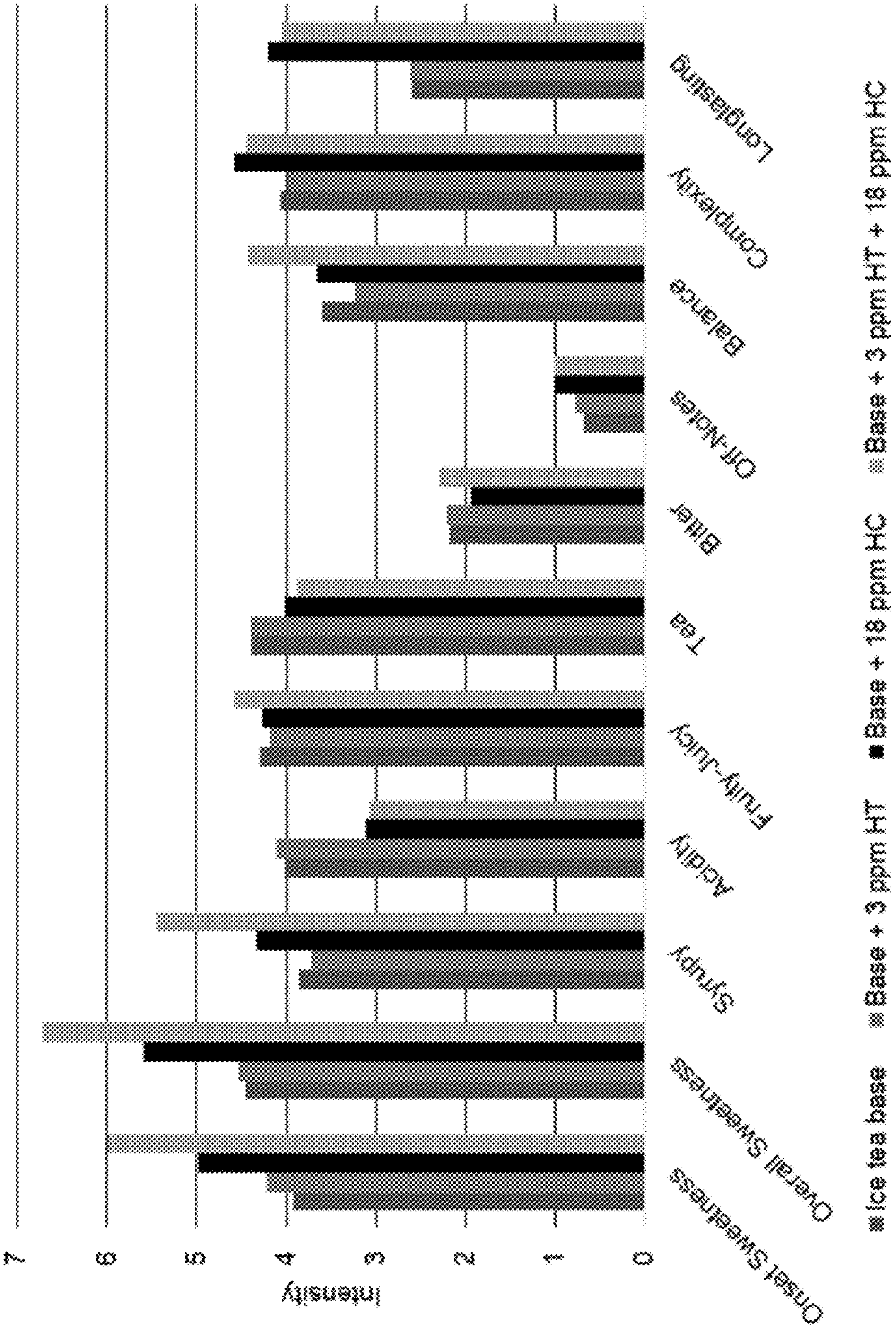
FIG. 6: Depiction of the sensory results of preparations with different dosing regimens of hesperetin and hesperetin dihydrochalcone according to Example 4 (HT/HC ratio 1:6).
Figure 7:
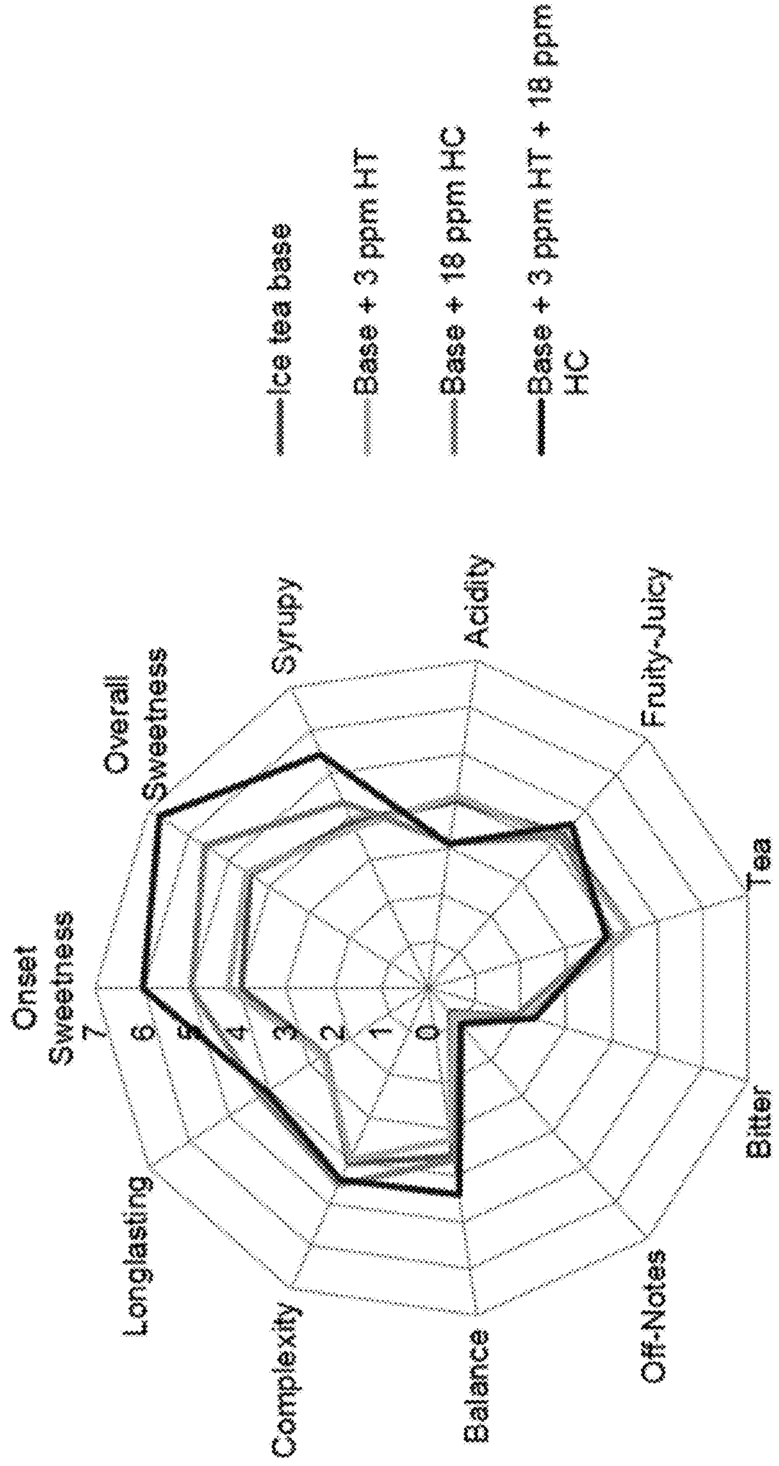
FIG. 7: Network diagram of the sensory results of Example 4 for the dosing ration 1:6 HT/HC.

A drinkable preparation with 7 wt.-% sucrose and 0.15 wt.-% citric acid was prepared. This preparation was used as a base composition for dosing tests with different dosing regimens of hesperetin dihydrochalcone and hesperetin. The different samples were evaluated by an expert panel consisting of five educated panelists and ranked on a scale from 0 to 9. The results of the testing are shown below in Table 3 as well as in FIG. 3. It can be derived from these data, that high dosing regimens of hesperetin in comparison to hesperetin dihydrochalcone exhibit strong off-tastes. At the same time, the sweetness impressions does not significantly increase, which results in an imbalanced taste profile.

TABLE 3

Sensory evaluation results of samples having hesperetin in excess

| Sample | | | | Description | | | | | | | |
|---|---|---|---|---|---|---|---|---|---|---|---|
| Sucrose [wt-%] | Citric acid [wt-%] | HT [ppm] | HC [ppm] | Onset Sweetness | Overall Sweetness | Balance | Long lasting | Sweetener Like | Astringent | Off-Notes | Comments |
| 7 | 0.15 | | | 4.5 | 5.5 | 5 | 0 | 0 | 1 | | |
| 7 | 0.15 | 3 | 10 | 5.5 | 7 | 4.5 | 1.5 | 1 | 1 | 1 | Slightly vanilla, phenolic |
| 7 | 0.15 | 20 | 10 | 6 | 7.5 | 4 | 2.5 | 1.5 | 2.5 | 1.5 | Slightly vanilla, phenolic |
| 7 | 0.15 | 30 | 10 | 6.5 | 8 | 3.5 | 4.5 | 2 | 3 | 3 | Vanilla, phenolic |
| 7 | 0.15 | 40 | 10 | 6.5 | 7.5 | 3 | 5 | 2.5 | 3.5 | 4 | Phenolic, smoky |
| 7 | 0.15 | 50 | 10 | 6.5 | 7.5 | 2.5 | 5 | 3 | 4 | 5 | Phenolic, smoky |

Example 4: Further Testing of the Influence of the Dosing of Hesperetin and Hesperetin Dihydrochalcone on Different Taste Aspects In order to further validate the insights derived from Example 1 and 2, the interaction and main effects of HT and HC are to be shown in a setup in which a drinkable preparation with a tea base, 0.05 wt.-% lemon flavor, 5 wt.-% high fructose corn syrup, 0.18 wt.-% citric acid and 0.03 wt.-% trisodium citrate was prepared. That preparation was divided into four samples by varying the dosage of HT and HC resulting in one sample containing no HT and no HC (control), containing 5 or 3 ppm HT and no HC (HT main effect), containing no HT and 5 or 18 ppm HC (HC main effect) and, respectively, containing 5 or 3 ppm HT and or 18 ppm HC (HT×HC interaction effect). This resulted in ratios of HT to HC of 1:1 and 1:6. The final preparations were profiled by an expert panel consisting of seven educated panelists (two measurements). Different sensorial attributes (ice tea language with focus on sweetness) were assessed and scored on an unstructured line scale (10 cm) for its perceived intensity. The results of the testing are shown below in Table 4 and 5 as well as in FIG. 4 to FIG. 7.

TABLE 4

| Tea Base [wt.-%] | Lemon Flavor [wt.-%] | HFCS [wt.-%] | Citric Acid [wt.-%] | Trisodium citrate [wt.-%] | HT [ppm] | HC [ppm] | Onset Sweetness | Overall Sweetness | Syrupy | Acidity |
|---|---|---|---|---|---|---|---|---|---|---|
| 0.30 | 0.05 | 5 | 0.18 | 0.03 | 0 | 0 | 3.56 | 3.87 | 3.12 | 4.11 |
| 0.30 | 0.05 | 5 | 0.18 | 0.03 | 5 | 0 | 3.89 | 4.07 | 3.59 | 4.06 |
| 0.30 | 0.05 | 5 | 0.18 | 0.03 | 0 | 5 | 4.19 | 4.46 | 3.96 | 3.46 |
| 0.30 | 0.05 | 5 | 0.18 | 0.03 | 5 | 5 | 4.97 | 5.53 | 5.24 | 3.67 |

| Tea Base [wt.-%] | Lemon Flavor [wt.-%] | HFCS [wt.-%] | Citric Acid [wt.-%] | Trisodium citrate [wt.-%] | HT [ppm] | HC [ppm] | Fruity-Juicy | Tea | Bitter | Off-Notes |
|---|---|---|---|---|---|---|---|---|---|---|
| 0.30 | 0.05 | 5 | 0.18 | 0.03 | 0 | 0 | 4.10 | 4.12 | 2.50 | 0.97 |
| 0.30 | 0.05 | 5 | 0.18 | 0.03 | 5 | 0 | 4.32 | 4.16 | 1.87 | 0.58 |
| 0.30 | 0.05 | 5 | 0.18 | 0.03 | 0 | 5 | 4.68 | 4.11 | 1.93 | 0.70 |
| 0.30 | 0.05 | 5 | 0.18 | 0.03 | 5 | 5 | 4.85 | 3.97 | 1.68 | 0.60 |

TABLE 4-continued

| Tea Base [wt.-%] | Lemon Flavor [wt.-%] | HFCS [wt.-%] | Citric Acid [wt.-%] | Trisodium citrate [wt.-%] | HT [ppm] | HC [ppm] | Balance | Complexity | Long lasting | Remarks |
|---|---|---|---|---|---|---|---|---|---|---|
| 0.30 | 0.05 | 5 | 0.18 | 0.03 | 0 | 0 | 3.33 | 3.59 | 2.67 | — |
| 0.30 | 0.05 | 5 | 0.18 | 0.03 | 5 | 0 | 3.94 | 3.87 | 2.79 | — |
| 0.30 | 0.05 | 5 | 0.18 | 0.03 | 0 | 5 | 3.68 | 3.90 | 3.11 | — |
| 0.30 | 0.05 | 5 | 0.18 | 0.03 | 5 | 5 | 5.01 | 4.80 | 3.33 | — |

TABLE 5

| Tea Base [wt.-%] | Lemon Flavor [wt.-%] | HFCS [wt.-%] | Citric Acid [wt.-%] | Trisodium citrate [wt.-%] | HT [ppm] | HC [ppm] | Onset Sweetness | Overall Sweetness | Syrupy | Acidity |
|---|---|---|---|---|---|---|---|---|---|---|
| 0.30 | 0.05 | 5 | 0.18 | 0.03 | 0 | 0 | 3.92 | 4.46 | 3.85 | 4.02 |
| 0.30 | 0.05 | 5 | 0.18 | 0.03 | 3 | 0 | 4.22 | 4.53 | 3.72 | 4.11 |
| 0.30 | 0.05 | 5 | 0.18 | 0.03 | 0 | 18 | 4.99 | 5.60 | 4.32 | 3.12 |
| 0.30 | 0.05 | 5 | 0.18 | 0.03 | 3 | 18 | 6.00 | 6.72 | 5.46 | 3.07 |

| Tea Base [wt.-%] | Lemon Flavor [wt.-%] | HFCS [wt.-%] | Citric Acid [wt.-%] | Trisodium citrate [wt.-%] | HT [ppm] | HC [ppm] | Fruity-Juicy | Tea | Bitter | Off-Notes |
|---|---|---|---|---|---|---|---|---|---|---|
| 0.30 | 0.05 | 5 | 0.18 | 0.03 | 0 | 0 | 4.31 | 4.40 | 2.18 | 0.68 |
| 0.30 | 0.05 | 5 | 0.18 | 0.03 | 3 | 0 | 4.19 | 4.39 | 2.21 | 0.77 |
| 0.30 | 0.05 | 5 | 0.18 | 0.03 | 0 | 18 | 4.27 | 4.01 | 1.94 | 1.01 |
| 0.30 | 0.05 | 5 | 0.18 | 0.03 | 3 | 18 | 4.57 | 3.88 | 2.29 | 1.01 |

| Tea Base [wt.-%] | Lemon Flavor [wt.-%] | HFCS [wt.-%] | Citric Acid [wt.-%] | Trisodium citrate [wt.-%] | HT [ppm] | HC [ppm] | Balance | Complexity | Long lasting | Remarks |
|---|---|---|---|---|---|---|---|---|---|---|
| 0.30 | 0.05 | 5 | 0.18 | 0.03 | 0 | 0 | 3.59 | 4.07 | 2.59 | — |
| 0.30 | 0.05 | 5 | 0.18 | 0.03 | 3 | 0 | 3.24 | 3.99 | 2.61 | — |
| 0.30 | 0.05 | 5 | 0.18 | 0.03 | 0 | 18 | 3.66 | 4.58 | 4.20 | — |
| 0.30 | 0.05 | 5 | 0.18 | 0.03 | 3 | 18 | 4.43 | 4.44 | 4.05 | — |

The invention claimed is:

1. A flavoring composition comprising:

(a) hesperetin; and (b) hesperetindihydrochalcone;

wherein hesperetin and hesperetindihydrochalcone are present in a weight ratio of 1:1 to 1:10 (hesperetin: hesperetindihydrochalcone); and (c) optionally, one or more additional flavoring substances.

2. The flavoring composition of claim 1 comprising:

(a) 0.01 to 20 wt. % of hesperetin; and (b) 0.01 to 20 wt. % of hesperetin dihydrochalcone, wherein all weight percentages are based on a total weight of the composition.

3. The flavoring composition of claim 1 comprising the one or more additional flavoring substances of (c).

4. The flavoring composition of claim 3, wherein the one or more additional flavoring substances of (c) are selected from unsaturated aliphatic alcohols, aliphatic aldehydes, aliphatic ketones, aliphatic acids, aliphatic esters, aliphatic thiols and dithiols, aliphatic nitrogen compounds, alicyclic compounds, alicyclic esters, terpene aldehydes, terpene ketones, terpene esters, terpene hydrocarbons, terpene oxides, aromatic compounds, aromatic aldehydes, aromatic esters, aromatic phenols, sulphur compounds, aromatic nitrogen compounds, aromatic oxides, aromatic lactones, heterocyclic compounds, heterocyclic furanes, heterocyclic pyrans, heterocyclic pyrroles, heterocyclic pyrazines, heterocyclic thiazoles, and mixtures thereof.

5. The flavoring composition of claim 3, wherein the one or more additional flavoring substances of (c) are selected from herbs.

6. The flavoring composition of claim 3, wherein the one or more additional flavoring substances of (c) are selected from vegetable juices, fruit juices, concentrates thereof, and mixtures thereof.

7. The flavoring composition of claim 3, wherein the one or more additional flavoring substances of (c) are selected from acetophenone, allyl caproate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene phthalide, carvone, camphene, caryophyllene, cineol, cinnamyl acetate, citral, citronellol, citronellal, citronellyl acetate, cyclohexyl acetate, cymene, damascone, decalactone, dihydrocoumarin, dimethyl anthranilate, dodecalactone, ethoxyethyl acetate, ethylbutyric acid, ethyl butyrate, ethyl caprate, ethyl caproate, ethyl crotonate, ethylfuraneol, ethylguaiacol, ethylisobutyrate, ethylisovalerate, ethyl lactate, ethylmethyl butyrate, ethyl propionate, eucalyptol, eugenol, ethyl heptylate, 4-(p-hydroxyphenyl)-2-butanone, gamma-decalactone, geraniol, geranyl acetate, geranyl acetate, grapefruit aldehyde, methyl dihydrojasmonate, heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenyl formate, cis-2-hexyl acetate, cis-3-hexyl acetate, trans-2-hexyl acetate, cis-3-hexyl formate, para-hydroxybenzyl acetone, isoamyl alcohol, isoamyl isovalerate, isobutyl butyrate, isobutyraldehyde, isoeugenol methyl ether, isopropyl methylthiazole, lauric acid, levulinic acid, linalool, linalool oxide, linalyl acetate, menthol, menthofuran, methyl anthranilate, methylbutanol, methylbutyric acid, 2-methylbutyl acetate, methyl caproate, methyl cinnamate, 5-methylfurfural, 3,2, 2-methylcyclopentenolone, 6,5,2-methylheptenone, methyl dihydrojasmonate, methyl jasmonate, 2-methylmethyl butyrate, 2-methyl-2-pentenol acid, methylthiobutyrate, 3, 1-methylthiohexanol, 3-methylthiohexyl acetate, nerol, nerol acetate, trans, trans-2,4-nonadienal, 2,4-nonadienol, 2,6-nonadienol, 2,4-nonadienol, nootkatone, delta-octalactone, gamma-octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl isovalerate, piperonal, propionaldehyde, propyl butyrate, pulegone, pulegol, sinensal, sulfurol, terpinene, terpineol, terpinolene, 8,3-s thiomenthanone, 4,4,2-thiomethylpentanone, thymol, delta-undecalactone, gamma-undecalactone, valencene, valeric acid, vanillin, acetoin, ethylvanillin, ethylvanillin isobutyrate (=3-ethoxy-4-isobutyryloxybenzaldehyde), 2,5-dimethyl-4-hydroxy-3 (2H)-furanone and derivatives thereof, homofuronol (=2-ethyl-5-methyl-4-hydroxy-3 (2H)-furanone and 5-ethyl-2-methyl-4-hydroxy-3 (2H)-furanone), maltol and maltol derivatives, coumarin and coumarin derivatives, gamma-lactones, delta-lactones, methyl sorbate, divanillin, 4-hydroxy-2 (or 5)-ethyl-5 (or 2)-methyl-3 (2H) furanone, 2-hydroxy-3-methyl-2-cyclopentenone, 3-hydroxy-4,5-dimethyl-2 (5H)-furanone, acetic acid isoamyl ester, butyric acid ethyl ester, butyric acid-n-butyl ester, butyric acid isoamyl ester, 3-methyl-butyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenylglycidate, ethyl-2-trans-4-cis-decadienoate, 4-(p-hydroxyphenyl)-2-butanone, 1, 1-dimethoxy-2,2,5-trimethyl-4-hexane, 2,6-dimethyl-5-hepten-1-al and phenylacetaldehyde, 2-methyl-3-(methylthio) furan, 2-methyl-3-furanthiol, bis(2-methyl-3-furyl) disulphide, furfurylmercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3 (2H)-furanone, guaiacol, 3-hydroxy-4,5-dimethyl-2 (5H)-furanone, 3-hydroxy-4-methyl-5-ethyl-2 (5H)-furanone, cinnamaldehyde, cinnamon alcohol, methyl salicylate, isopulegol stereoisomers thereof, enantiomers thereof, positional isomers thereof, diastereomers thereof, cis/trans isomers thereof, epimers thereof, and mixtures thereof.

8. The flavoring composition of claim 1, further comprising:

(d) one or more compounds conveying a sweet taste.

9. The flavoring composition of claim 8, wherein the one or more compounds of (d) conveying a sweet taste of are selected from natural sweeteners, sweet tasting carbohydrates, sugar alcohols, D-amino acids, extracts or fractions obtained from natural sources containing D-amino acids, protein containing D-amino acids, and mixtures thereof.

10. The flavoring composition of claim 8, wherein the one or more compounds of (d) conveying a sweet taste are selected from neohesperidindihydrochalkon, naringindihydrochalkon, steviolgylcoside, stevioside, steviolbiosid, rebaudioside, rebaudioside A, rebaudioside B, rebaudioside C, rebaudioside D, rebaudioside E, rebaudioside F, rebaudioside G, rebaudioside H, rebaudioside M, rebaudioside N, rebaudioside X, dulcoside, rubusoside, suavioside A, suavioside B, suavioside G, suavioside H, suavioside I, suavioside J, baiyunoside 1, baiyunoside 2, phlomisoside 1, phlomisoside 2, phlomisoside 3, phlomisoside 4, abrusoside A, abrusoside B, abrusoside C, abrusoside D, cyclocaryoside A, cyclocaryoside I, oslandin, polypodoside A, strogin 1, strogin, 2, strogin 4, selligueanin A, dihydroquercetin-3-acetate, perillartin, telosmosid A15, periandrin I-V, pterocaryoside, cyclocaryoside, mukurozioside, trans-Anethol, trans-cinnamaldehyd, bryoside, bryonoside, bryonodulcoside, carnosifloside, scandenoside, gypenoside, hematoxylin, cyanin, chlorogensäure, albiziasaponin, telosmoside, gaudichaudiosid, mogrosides hernandulcine, monatin, glycyrrhetinic acid and its derivatives, *Stevia rebaudiana, Rubus suavissimus*, balansin A, balansin B, and mixtures thereof.

11. The flavoring composition of claim 8, wherein the one or more compounds of (d) conveying a sweet taste are selected from synthetic sweeteners.

12. A preparation selected from foodstuff, preparations for pleasure, beverages, semi-finished products, and oral hygiene products, wherein the preparation comprises 0.01 to 10 wt. % of the flavoring composition of claim 1, based on a total weight of the preparation.

13. The preparation of claim 12, further comprising:

(d) one or more compounds conveying a sweet taste.

14. The preparation of claim 13, wherein the one or more compounds of (d) conveying a sweet taste of are selected from natural sweeteners, sweet tasting carbohydrates, sugar alcohols, D-amino acids, extracts or fractions obtained from natural sources containing D-amino acids, protein containing D-amino acids, and mixtures thereof.

15. The preparation of claim 13, wherein the one or more compounds of (d) conveying a sweet taste are selected from neohesperidindihydrochalkon, naringindihydrochalkon, steviolgylcoside, stevioside, steviolbiosid, rebaudioside, rebaudioside A, rebaudioside B, rebaudioside C, rebaudioside D, rebaudioside E, rebaudioside F, rebaudioside G, rebaudioside H, rebaudioside M, rebaudioside N, rebaudioside X, dulcoside, rubusoside, suavioside A, suavioside B, suavioside G, suavioside H, suavioside I, suavioside J, baiyunoside 1, baiyunoside 2, phlomisoside 1, phlomisoside 2, phlomisoside 3, phlomisoside 4, abrusoside A, abrusoside B, abrusoside C, abrusoside D, cyclocaryoside A, cyclocaryoside I, oslandin, polypodoside A, strogin 1, strogin, 2, strogin 4, selligueanin A, dihydroquercetin-3-acetate, perillartin, telosmosid A15, periandrin I-V, pterocaryoside, cyclocaryoside, mukurozioside, trans-Anethol, trans-cinnamaldehyd, bryoside, bryonoside, bryonodulcoside, carnosifloside, scandenoside, gypenoside, hematoxylin, cyanin, chlorogensäure, albiziasaponin, telosmoside, gaudichaudiosid, mogrosides, hernandulcine, monatin, glycyrrhetinic acid and its derivatives, *Stevia rebaudiana, Rubus suavissimus*, balansin A, balansin B, and mixtures thereof.

16. The preparation of claim 13, wherein the one or more compounds of (d) conveying a sweet taste are selected from synthetic sweeteners.

17. A preparation selected from foodstuff, preparations for pleasure, beverages, semi-finished products, and oral hygiene products comprising the the flavoring composition of claim 1, wherein the preparation comprises:

(a) 0.1 to 20 ppm hesperetin; and (b) 1 to 30 ppm hesperetindihydrochalcone.

18. The preparation of claim 17, wherein the flavoring composition improves richness, body, authenticity, impact, mouthfeel, sweetness, and/or juiciness to the preparation.

19. A method for improving taste of a preparation comprising:

(a) providing a preparation;

(b) providing a flavoring composition of claim 1;

(c) combining the preparation of (a) with the flavoring composition of (b); and (d) obtaining a preparation with improved taste.

20. The method of claim 19, wherein the method improves richness, body, authenticity, impact, mouthfeel, sweetness, and/or juiciness of the preparation.

* * * * *